United States Patent
Loveland et al.

(10) Patent No.: US 10,366,287 B1
(45) Date of Patent: Jul. 30, 2019

(54) IMAGE ANALYSIS AND ESTIMATION OF ROOFTOP SOLAR EXPOSURE

(71) Applicant: Loveland Innovations, LLC, Pleasant grove, UT (US)

(72) Inventors: Jim Loveland, Alpine, UT (US); Leif Larson, Alpine, UT (US); Dan Christiansen, Alpine, UT (US); Tad Christiansen, Alpine, UT (US)

(73) Assignee: Loveland Innovations, LLC, Pleasant Grove, UT (US)

( * ) Notice: Subject to any disclaimer, the term of this patent is extended or adjusted under 35 U.S.C. 154(b) by 0 days.

(21) Appl. No.: 16/228,019

(22) Filed: Dec. 20, 2018

Related U.S. Application Data

(60) Provisional application No. 62/722,714, filed on Aug. 24, 2018.

(51) Int. Cl.
| | | |
|---|---|---|
| *G01C 11/02* | (2006.01) | |
| *G06K 9/00* | (2006.01) | |
| *G01J 1/44* | (2006.01) | |
| *B64C 39/02* | (2006.01) | |
| *G01J 1/42* | (2006.01) | |

(52) U.S. Cl.
CPC ........ *G06K 9/00637* (2013.01); *B64C 39/024* (2013.01); *G01J 1/44* (2013.01); *G06K 9/00657* (2013.01); *B64C 2201/123* (2013.01); *G01J 2001/4276* (2013.01)

(58) Field of Classification Search
CPC ...... G06K 9/0063; G01C 11/02; H04N 7/185; G06T 7/0053
See application file for complete search history.

(56) References Cited

U.S. PATENT DOCUMENTS

| | | |
|---|---|---|
| 6,137,896 A | 10/2000 | Chang |
| 6,292,575 B1 | 9/2001 | Bortolussi et al. |
| 6,563,023 B2 | 5/2003 | Liu et al. |
| 8,577,616 B2 | 11/2013 | Dunlap |
| 9,609,288 B1 * | 3/2017 | Richman ................ H04N 7/183 |
| 2003/0123713 A1 | 7/2003 | Geng |

* cited by examiner

*Primary Examiner* — Nam D Pham
(74) *Attorney, Agent, or Firm* — Phillips Ryther & Winchester; Justin K. Flanagan

(57) ABSTRACT

An unmanned aerial vehicle (UAV) solar irradiation assessment system may automate several design parameters of solar panel design, cost and payoff estimations, and installation. The system determines the irradiance at various locations on a roof during various time periods. The system accounts for the effects of various existing or potential obstacles on the roof of a structure and/or proximate the structure. In some embodiments, a visual model (e.g., two-dimensional or three-dimensional) of the roof may be shown with a heatmap of irradiance values and/or graphical placement of solar panels. In other embodiments, the data may be analyzed and reported without visual presentation.

12 Claims, 16 Drawing Sheets

| Panel Size | Qty. | Watts | Price |
|---|---|---|---|
| 2'X4' Panels = $235.00 | 4 ◀▶ | 600 | $940.00 |
| 3'X6' Panels = $270.00 | 2 ◀▶ | 400 | + $540.00 |
| 4'X6' Panels = $350.00 | 0 ◀▶ | 0 | + 0 |
| 4'X8' Panels = $525.00 | 0 ◀▶ | 0 | + 0 |
| Subtotals: | 6 | 1000 | $1480.00 |

Number of Months: 60

= $24.66 per Mo.

Back    Continue

FIG. 14

IMAGE ANALYSIS AND ESTIMATION OF ROOFTOP SOLAR EXPOSURE

PRIORITY APPLICATIONS

This application claims priority to U.S. Provisional Patent Application No. 62/722,714, titled "Systems and Methods for Imaging and Reporting the Solar Irradiance of a Structure" filed on Aug. 24, 2018, which is hereby incorporated by reference in its entirety.

TECHNICAL FIELD

This disclosure relates to systems and methods for determining actual and forecasted spatial and/or temporal solar irradiance values relevant to solar panel installation and utilization via an unmanned aerial vehicle (UAV).

BRIEF DESCRIPTION OF THE DRAWINGS

Non-limiting and non-exhaustive embodiments of the disclosure are described herein, including various embodiments of the disclosure with reference to the figures listed below.

FIG. 14 illustrates a GUI of a system enabling an operator to select sizes, quantities, power, and/or prices of a plurality of solar panels for installation.

DETAILED DESCRIPTION

Figure 1:
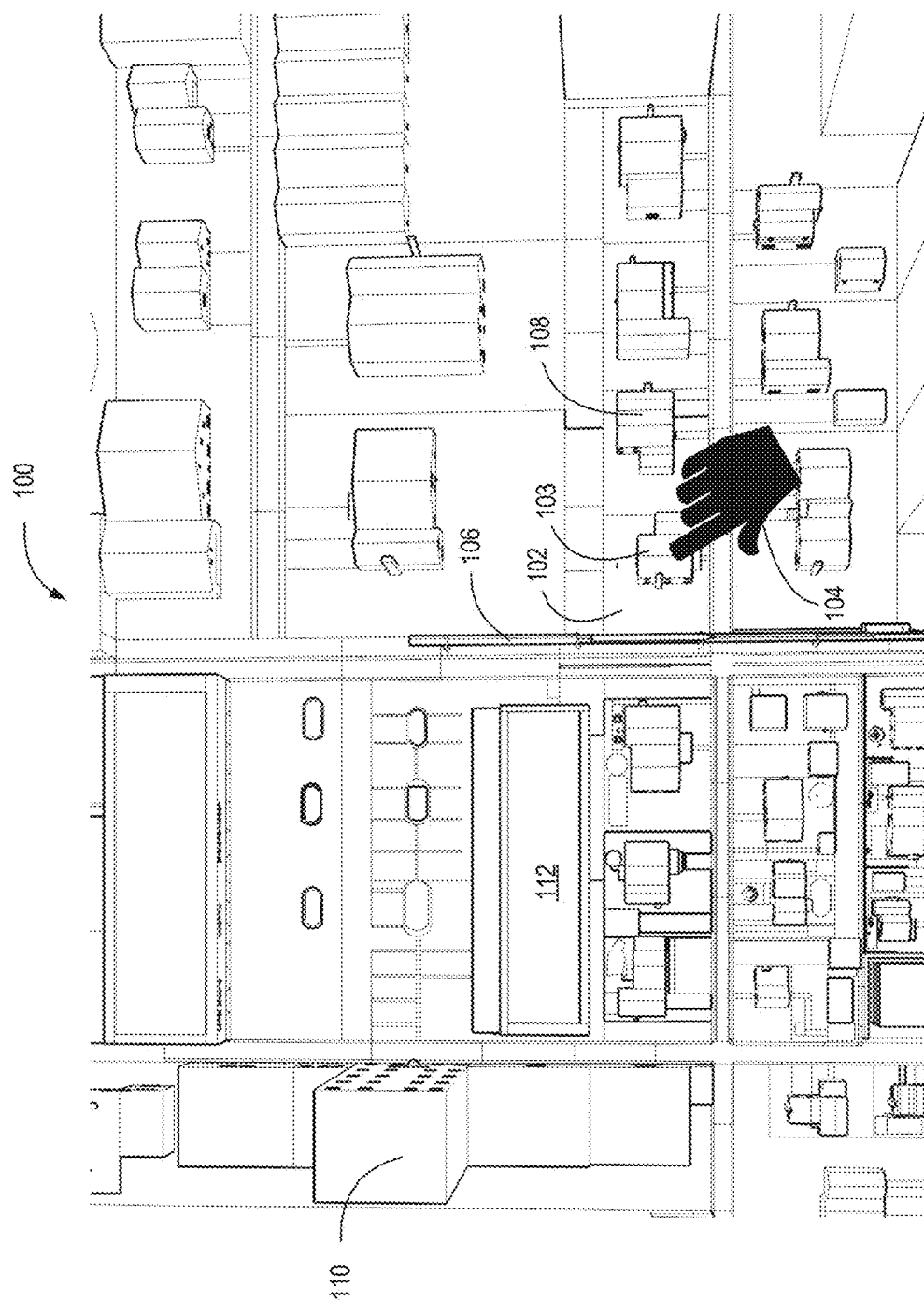
FIG. 1 illustrates an operator selecting a structure based on a satellite image of a group of houses, according to one embodiment.

This disclosure provides methods and systems for assessing structures and/or other real property using an unmanned aerial vehicle (UAV). A UAV may carry an optical imaging or other sensing system to capture a sequence of images of a target object, such as a structure. The UAV may position itself above the location of interest to allow the imaging system to capture a nadir image of an area of interest (e.g., a target structure). The UAV may follow a boustrophedonic flight path while the imaging system captures a series of images and/or collects non-image scan information. The UAV may position itself around the structure to collect oblique images at one or more heights on each side of the structure and/or one or more corners of the structure. To collect partial or full structural information, the UAV may perform a loop scan while the imaging system captures a set of oblique images. For additional detailed images of the area of interest, the UAV and imaging system may perform a series of microscans. Using the collection of images, a rendering system may generate interactive models of the target structure or another object.

This disclosure also provides systems and methods for post image and data collection processing, visualization, annotation, and reporting. This disclosure provides some examples of how images (including optical images, infrared images, moisture sensor data images, ultraviolet images, ultrasonic images, and false-color representations thereof) and other data may be collected as full-subject views, oblique images, perpendicular images, and microscan surface and subsurface views. Ultimately, a context-rich visualization of the target location may create one or more markers identifying solar irradiance values at target locations. For example, microscan images of target locations on a roof of a structure may include an estimate of annual solar irradiance (e.g., measured in cumulative $kWh/m^2$). The operator may select a target location, such as a planar section off a roof or portion thereof, and the system may then display a context-rich visualization of the annual solar irradiation associated with the selected target location.

In some embodiments, the system may generate a detailed finite element model, or heatmap, of the solar irradiance. At each target location, the system calculates a total solar irradiance for a period of time (e.g., a day, month, year, or another period of time). The system may calculate the solar irradiance for different seasons, for each of a plurality of days, for only weekdays when a business is in operation, monthly, a yearly total, or an average over a time period. For example, the system may calculate solar irradiance values for a ten-year average. The system may identify obstructions and calculate expected reductions in solar irradiance base on the object.

In some embodiments, shadows are detected via a sensor or via image processing. In such embodiments, solar irradiance levels may be reduced in the locations where shadows are sensed or calculated from an image. Such embodiments may fail to account for shadows at future times and earlier times. For instance, at noon the sun may be directly overhead, and so the system may detect very small shadows or possibly no shadows at all. However, shadows calculated to be present at future times may be relatively large. For example, a relatively large chimney may cast very little or no shadow on a rooftop when the sun is directly overhead. However, during mid-morning, the chimney may cast a relatively large shadow on a first portion of the roof. During mid-afternoon, the chimney may cast relatively large shadows on a completely different portion of the roof. Thus, the detected shadows at any given time may be relatively insignificant as compared to the calculated impact of shadows during a given time period of a day, week, month, year, or years.

In other embodiments, objects that can cast shadows relative to the surface of the roof are identified rather than shadows themselves. In such embodiments, the relative spatial locations of each planar section of the roof, objects on the roof, and objects or other structures proximate the roof are determined. For example, a UAV may capture images (optical or otherwise) and the UAV or a remote system may perform imaging processing and/or utilize computer vision techniques to identify planar sections of the roof, relative pitches thereof, objects on the roof, and/or objects and structures proximate the roof.

For example, the system may identify a tree that will cast a shadow over portions of the roof at various times of day. A graphical user interface may show a heatmap that uses various shades of gray or different colors to illustrate the relative impact or effect of various obstacles. White or red may be used to show unshaded portions of the roof. Darker grey shading or darker shades of blue may be used to show the impact or effect of shadows cast by obstacles on the roof that have a significant or relatively higher light-blocking effect. Lighter grey shading or various shades of red may be used to shows the impact or effect of shadows cast by obstacles that have less of an overall light-blocking effect.

Thus, in some instances the shadow of a future obstacle may be shown as having less of an effect than an existing obstacle simply because the future obstacle may affect the solar irradiance for a fewer number of years. For example, a tree may be estimated to cast a shadow for only the last five years of a 20-year time period. In some embodiments, the system may include or interface with an external tree variety identification subsystem. The tree variety identification subsystem may identify the variety of a detected tree and estimate a mature-sized tree. The estimated mature-sized tree may then be used to identify future or potential shadows on the portion of the roof of the structure.

The tree variety identification subsystem may utilize samples from the tree, user input manually identifying a tree variety, or images of the tree. For example, the system may utilize images of the foliage, tree shape, and/or bark to identify the tree variety. A wide variety of systems, methods and techniques for identifying plant species, including identifying tree species, may be utilized and/or included within the presently described systems and methods. An example of such a system is described in U.S. Pat. No. 8,577,616 titled "System and Method for Plant Identification," which is hereby incorporated by reference in its entirety as it relates to the tree variety identification subsystem and is not inconsistent herewith.

In some embodiments, the system may determine whether an identified tree is a deciduous tree or an evergreen tree and modify the expected solar irradiance accordingly. Specifically, a deciduous tree may be expected to block less sunlight during the winter (when it has no leaves) and block more sunlight during the summer when it has leaves. Current systems that detect trees, and manual detection of trees by human operators, may inaccurately estimate the impact of the tree if the analysis is done during the winter or early spring. Some embodiments of the presently described systems may identify shadows from a deciduous tree in the winter months and calculate or estimate the expected shadows on the roof during the summer months when the tree is in full foliage. In such embodiments, the identification of the tree variety may be based on manual user selection or bark image analysis.

The system may identify portions of the roof where snow might be expected to accumulate on the roof during certain times of the year. These identified objects, and specifically the relative locations of these objects, may affect the annual or average solar irradiance on portions of the roof. The system may create a detailed finite element model of the irradiance at target locations on the structure or property.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

In some embodiments of the present disclosure, a technician may manually operate a UAV to perform one or more assessment tasks. For example, a technician may manually operate a drone to capture photographs that would otherwise have required the technician to scale a building. Some UAVs have semi-autonomous capabilities. These UAVs may be directed to capture photographs of an operator-identified location. However, semi-autonomous UAVs may not capture a comprehensive image collection of the entire site and may not provide adequate information to replace an on-site technician. Some UAVs are autonomous. A technician may program autonomous UAVs offsite to follow a boustrophedonic flight pattern and identify, pre-flight or during flight, one or more target areas for detailed microscans. In some embodiments, the technician turns on the UAV, selects a property, and the system autonomously performs the scan and determines irradiance values at various locations.

The UAV assessment and reporting systems described herein provide comprehensive, automatic (or at least semi-automatic), and methodical approaches for assessing a structure or other object for a particular purpose. The types of assessments, reports, and images collected may vary based on a specific use case. Generally, the approaches obviate the need for an industry-specific trained technician to be present and/or change the relevant qualifications of a suitable technician. In some embodiments, the approach may significantly reduce the workload of a technician. Although this disclosure provides many examples in the context of a rooftop of a residential building, a person with ordinary skill in the art will recognize that the system is not confined to any particular type of structure. Any solar panel installation site may benefit from the systems and methods described. For example, the systems described in this application may be applied with some adaptation or modification to an empty field, a skyscraper, a house, an apartment complex, a commercial building or factory, and/or any other solar panel installation site.

In one embodiment, a graphical user interface (GUI) allows a user to provide operator input for a desired solar irradiance level and/or available or acceptable solar panel size(s). The UAV may identify locations of actual obstructions and/or future obstructions to the solar exposure. Solar exposure may be measured as a flux of energy such as irradiance per unit area ($kw/m^2$). Solar exposure may be determined as a historical average for a region, adjusted to compensate for the pitch of the roof and reduced in locations calculated to have obstructions occluding solar exposure. To determine the location of relevant obstructions, an imaging system (e.g., a camera and/or a sensor) captures images/data and determines, based on the time of day, a solar angle of irradiance. Based on historical measurements and/or collected data, the system may calculate the total irradiance for a period of time. The period of time may be measured in hours, days, months, years, or multiple years. The imaging system may also determine whether any obstructions could obstruct the irradiance throughout the day and identify the locations of the obstructions and their shadows.

A solar evaluation system may determine the total irradiance at a target location. For example, the solar evaluation system may use historical data (e.g., known angles and locations of the sun day-by-day, expected number of sunny days and cloudy days, etc.) to determine the total solar irradiance expected at the target location for one year (or another period of time). In some embodiments, it may be useful to calculate a first solar irradiance value during hot months when air conditioners are in use and calculate a second solar irrandiance value in colder months when electrical usage is lower.

In some embodiments, the solar evaluation system may determine the solar irradiance through a direct measurement either on the ground or via the UAV. The solar evaluation system may convert the direct measurement into an estimate at the target location based on the location of the obstacles and the length of time they are expected to interfere with the solar exposure based on the angle of solar irradiance. The length of time an obstruction occludes solar exposure may be measured in hours, days, months, years, or multiple years. The system (e.g., the UAV and/or associated remote computing system) may determine the angle of irradiance, a level of irradiance at the target location, and any obstructions to the irradiance at the target location. The solar evaluation system may use this information to determine an estimated total irradiance reaching a target location for a period of time and reduce the total irradiance based on the time the obstructions are calculated to occlude solar exposure.

In some embodiments, the system may determine a pitch of one or more planar surfaces making up the roof of a structure. For example, a UAV may utilize a sensor to make at least two distance measurements from at least two different locations relative to the roof (e.g., two different elevations or horizontal positions) and calculate the pitch of the roof. The system may include an electronic non-transitory computer-readable medium for storing instructions that, when executed by a computing device, cause hardware components of the system to perform operations to calculate the total irradiance at the target location (e.g., a roof or surface of a roof) for a defined period of time.

In some embodiments, the solar evaluation system may include a site selection interface. The site selection interface may receive an electronic input from a user identifying the site or location of a structure. For example, the site selection interface may identify geographic boundaries of an area, an address, and/or the GPS coordinates of a structure. The solar evaluation system may include a hazard input selection system to receive electronic input identifying geographic hazards. Such hazards may include above-ground power lines, tall trees, neighboring structures, etc.

The UAV may include a camera, proximity sensor, and/or other sensors to identify navigational obstacles and/or solar irradiance obstructions. In many cases, navigational obstacles may also be obstructions. The terms "obstacle" and "obstruction" may be used interchangeably in some instances and understood as being relevant to UAV navigation and/or solar irradiance based on context. The camera or sensor may communicate with an imaging system to determine the angle of irradiance. For example, based on the time of day of the UAV scan, the system may estimate or calculate a total irradiance level.

The UAV may include an imaging system with sonar sensors, lidar sensors, infrared sensors, optical sensors, irradiance sensors, and/or radar sensors. In some embodiments, the imaging system includes one visible light imaging camera and any combination and number of other types of sensors. The imaging system may determine the angle of irradiance (e.g., the location of the sun) at a given time. The determined angle of irradiance may be used to calibrate the relative location of the structure with the sun. Known values of the angle of irradiance at other times of day and during other days of the year may be used to calculate solar irradiance values for each portion of the roof of the structure. The system can calculate solar irradiance values at the specific location for a period of time (e.g., the system may estimate the irradiance for a month, year, or another period of time utilizing forecasted data).

As previously described, the UAV imaging system may identify locations of obstructions to solar irradiance. The imaging system may determine the length of time the obstruction interferes with the irradiance at each location on the roof of the structure. For example, the UAV imaging system may determine the hours the obstruction obstructs the irradiance throughout the day based on a calculated length of time. The impact of the obstructions on the total received solar irradiance depends on the angle of the sun when the obstruction casts a shadow and the relative angle of the impacted portion of the roof.

The UAV may include an onboard processor and/or a communication interface to communicate with the controller and/or the interface's cloud-based processing. The UAV may conduct a structural assessment. The structural assessment may include a first boustrophedonic scan of the area defined by geographic boundaries that include the structure. The boustrophedonic scan may include capturing images and/or irradiance during a boustrophedonic flight pattern within a first altitude range. The boustrophedonic scan may include determining distances to a surface for each of a plurality of potential vertical approaches within the area defined by the geographic boundaries. The UAV assessment and reporting system may include identifying a structure on the site based on the identified geographic boundaries and/or the boustrophedonic scan of the area. The UAV assessment and reporting system may include a loop scan of the structure. The loop scan may include a second flight pattern for the UAV to travel around the perimeter of the structure. The second flight pattern may be at a second altitude range lower than the first altitude range. The UAV assessment and reporting system may include a target location scan of the structure in a third flight pattern that includes vertical approaches proximate the structure to capture detailed images at target locations on the structure.

The UAV may include one or more processors and/or a communication interface to communicate with the controller and/or the interface's cloud-based processing. The UAV may calculate solar irradiance values at the target location and/or supply data to remote processing devices in real-time or via a post-landing data transfer. Regardless of which portion of the system implements the algorithms, the system may calculate the total irradiance for the period of time (e.g., one day of irradiance) for each location on a roof of a structure. The system may adjust the irradiance values calculated at various locations on the roof based on the identified location of obstructions to the irradiance and various times of day, based on known (e.g., historical data and/or forecasted data) locations of the sun on each day of a week/month/year and the relative angles of the surfaces of the structure.

In some embodiments, obstructions to portions of the surface of the roof may actually be reflective and increase solar irradiance on other portions of the surface of the roof at various times of the day. For example, a copper-clad chimney, aluminum sheeting, or a tourelle (e.g., a copper-coated decorative cone-shaped turret) may block solar irradiance relative to some portions of the planar surfaces of the roof but actually increase solar irradiance to other portions of the roof due to reflections. In such embodiments, the system may identify material types of the various obstructions and/or other portions of the roof to determine reflectivity properties. Solar irradiance values may be adjusted accordingly based on solar irradiance obstructions and reflections.

As previously noted, the UAV solar irradiation assessment system may include a site selection interface to receive electronic input identifying a structure. In some embodiments, the operator may control the device through remote-control. For example, the operator may direct the UAV to an operator-identified location and capture data. The operation may be semi-autonomous such that the operator directs the device to various locations for analysis. In other embodiments, the device may be fully autonomous. For example, the operator may begin the assessment by placing the UAV in a safe location for takeoff and select a "start" or "begin" icon on the computing device or UAV. The operator may select the nearest roof or one or more roofs for analysis by the UAV. The system may analyze the nearest roof, or one or more roofs based on the operator selection. For example, the system may use satellite images, real-time nadir images, or satellite images aligned using nadir images to select a structure for analysis.

The operator may, for example, be an employee, contractor, or agent of a solar panel installation company, a roofing company, an inspector, an analyst, an owner of the structure, and/or another person involved with the design and installation of solar panels on a roof or structure. In some embodiments, the operator of the UAV may utilize a remote control system such as a personal computer or personal electronic device. Examples of such devices include watches, tablets, laptops, smart glasses, wearable technology, and mobile phones. For example, an operator may use the computing device to initiate an assessment of solar irradiance via a software program on the computing device. In some embodiments, the computing device may comprise custom hardware designed specifically to implement the systems and methods described herein. In other embodiments, a computing device may be customized and made to perform new functions through the incorporation of additional hardware, software, and/or firmware. The autonomous or semi-autonomous processes may obviate the need for an industry-specific trained technician to be present and/or may substantially reduce the workload of a technician. In some embodiments, a salesperson may use the UAV system to perform an initial scan and capture the necessary data for the technician to begin a detailed design review at a remote location.

The UAV may perform a boustrophedonic scan to determine the irradiance of the site or a structure on the site. During the boustrophedonic scan, the UAV may follow a predetermined flight pattern. For example, the UAV may travel from one edge to the opposite edge of the site in alternating offset zones. One or more cameras and/or sensors on the UAV may obtain data, make measurements, and/or capture images of the site throughout the boustrophedonic flight pattern.

A UAV may carry an imaging system and/or one or more sensors to capture data and images of a roof. The UAV may capture relative solar irradiance, energy flux, and/or solar exposure in the visible light, ultraviolet, and/or infrared wavelengths as part of the scan. The relative values can be used to crosscheck calculations of surface pitch and the identification of obstructions. For example, the system may assume that two unobstructed surfaces, having the same angle relative to the sun, will have the same solar irradiance values at a given time. If sensors on the UAV (e.g., a camera) detect otherwise, the system may re-evaluate or attempt to identify the angles of the surfaces and/or identify any obstructions that may be causing the difference. Thus, the system may utilize real-time solar irradiance values to ensure an accurate model for calculating temporally averaged solar irradiance values.

The UAV may use other sensors, including moisture sensors, sonar sensors, optical sensors, ultrasonic sensors, LIDAR, RADAR, irradiance sensors, and/or other sensors to capture data. The UAV may capture picture and/or video data in the visible, infrared, and/or ultraviolet spectrums. As used herein, the term "image" is used broadly to include visible-spectrum images, as well as "images" captured using alternative sensor types in the infrared, ultraviolet, and/or ultrasonic sensor systems. For example, some images may be visible spectrum images, some images may be infrared images presented in false color, while other images may be infrared presented in numerical values overlaid on a finite element model of the roof of the structure. Some images may correlate to a single numerical value, for example, the irradiance at a specified location.

Ultimately, the scan can be used to generate a context-rich report of solar irradiation at various locations along the roof of a structure (or at specific areas of the site). The operator may select a target location on the roof, and the system may display the solar energy flux, irradiation, exposure, and/or other data relevant to the installation of a solar panel at the specified location. The system may generate a report with a digital full subject image (e.g., a three-dimensional model of the structure, a three-dimensional model of the roof, and/or a model of a portion of the roof.

The UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude while the camera captures images of the structure at one or more angles. The angles may be oblique or perpendicular to the walls of the structure. The UAV assessment and reporting system may use these images to create a three-dimensional model of the structure. In one embodiment, the UAV may make multiple passes around the perimeter of the structure at different altitudes. For example, the UAV may fly around the perimeter at a first altitude to capture images of the structure at a first angle and then fly around the perimeter at a second altitude to capture additional images of the structure at a second angle. In other embodiments, a loop scan is not needed if sufficient data is captured during one or more boustrophedonic scans.

The UAV may perform a microscan for close-up detailed images of a target location or other area of interest. In some embodiments, the UAV may perform a series of vertical approaches near the structure. In some embodiments, the vertical approaches may be simulated via digital or optical zooming of a camera. In other embodiments, the resolution of the camera may obviate the need for vertical approaches. The UAV may perform microscans by traversing the surface of a structure or other real property at a target distance in a boustrophedonic or loop pattern.

In various embodiments, the UAV may perform a 360-degree panoramic scan of a surrounding area and/or capture similar data via one or more nadir images. For example, a UAV may be positioned above a structure (e.g., a peak of a roof) and remain in approximately the same location relative to the structure while the UAV rotates 360-degrees to capture a panoramic image of the surrounding area. As a specific example, a UAV may fly to a height above the roof (e.g., 5' or 10' above the highest point on the roof or site) and scan the site for obstacles in the surrounding area as it rotates 360-degrees. The system may utilize the 360-degree scan of the surrounding area to calculate distance measurements to surrounding buildings, obstacles, trees, vacant lots, and/or other objects of interest.

The system may identify existing and/or potential obstructions to the solar irradiance received by the surfaces of the roof. For example, the system may identify a tree that will cast a shadow on a portion of the roof of the structure at some time of the day and/or time of year. Such an obstacle is considered an "existing obstruction" because as it currently exists, it is an obstruction during at least one time of day and/or for at least some of the days each year. The UAV does not necessarily measure or detect an existing shadow since the tree may not currently cast a shadow because of the location of the sun due to the time of day and/or time of year. Rather, the UAV identifies the relative location, shape, and/or height of an obstacle and calculates shadows at the various times of day on various days throughout a given month or year.

In contrast, a tree that is still small may not currently cast a shadow at any time of day during any days of the year. Nevertheless, such an object may be identified as a "potential obstruction" or "future obstruction." The system may detect that the tree could grow, or is expected to grow, a certain amount, at which point it would begin to obstruct solar irradiation during at least some time periods during the day and on at least some days of each year. The owner of the structure looking to install solar panels may determine to cut down the tree to eliminate the potential obstruction, or design the solar system to account for the tree as if it were full grown and an actual obstruction.

In some embodiments, the 360-degree panoramic scan may assess neighboring lots, adjacent buildings, and/or other information not located on the site. For example, the UAV may scan an adjacent vacant lot, connect to a network, and determine that the lot is zoned for commercial use. The system may then calculate that although the vacant lot does not presently interfere with the irradiance received at the site, future developments may impact the irradiance and solar exposure received at various locations on the roof and/or site. The system may follow a similar process for neighboring trees, predicting their future growth and reducing the expected irradiance at various locations of the site. In some embodiments, the system can determine the zoning for adjacent lots in real-time. For example, the system may utilize a network connection to determine whether a developer of an adjacent lot has submitted any plans for the lot (e.g., available city or county records). The system can utilize this information to make more accurate predictions about the potential impact the development of the adjacent lot may have on the site.

The system may automatically select and/or an operator may manually select a target distance for default scanning based on the resolution of a camera, desired level of detail, adjustability of the camera, and/or a fixed field of view of the camera. The camera may obtain images corresponding to specific dimensions (e.g., a known area) on the roof's surface. For example, the dimensions of the known area may correspond to a finite element of the heatmap model. A camera may have a fixed field of view or an adjustable (zoomable) field of view. The square footage and dimensions of the portion of the roof captured in a single image depend on the field of view of the camera and the distance of the camera from the roof. A given field of view may determine the target distance. The correct field of view and distance measurements ensure that the captured images correctly correspond to the specified dimensions at the target location. As such, the system may store the field of view and distance measurements as metadata associated with each captured image. In some embodiments, default square footage per image may be 50 square feet, 100 square feet, 200 square feet, etc. The images may be square or rectangular with any of a wide variety of aspect ratios.

In some embodiments, the UAV solar irradiance system may generate a shaded map of the roof showing areas of the roof receiving varying levels of solar energy during a given time period. For example, a heatmap of the solar irradiance along the roof may be generated for a day, month, or year. The heatmap may comprise a series of finite elements each representing a target location on the roof. The heatmap may consider the total or average irradiance at the target location based on the known angle of the roof, known locations of the sun at various times of day and various days throughout a given week, month, year, etc. For example, a chimney, pipes, trees, the direction of the roof panels, and/or other factors may affect the amount of irradiance available at each specific location on the roof. Moreover, the location of chimney, vent, skylight, etc. may impact the possible locations for solar panel installation. The system may divide the site into discrete finite elements each receiving different solar exposure assessments. For example, the model can average the flux over discrete sections of the roof. A completely obstructed area may receive an average of zero Watts/meter$^2$ (e.g., 0 W/m$^2$). In other largely unobstructed locations, the irradiance may have a higher average (e.g., to 1,367 W/m$^2$ or another amount).

In other embodiments, the heatmap may be graphically illustrated as varying levels of grey, where dark areas represent areas with less irradiance and lighter areas represent areas with more irradiance. In still other embodiments, colors, or shades of particular colors, may be used to illustrate the solar irradiance received by various locations on the roof of a structure.

The heatmap may enable a user to quickly visualize the optimal location for solar panels at the site. In some embodiments, the system may use the finite element data to determine and recommend the optimal placement of solar panels. An operator may not immediately recognize the optimal location for solar panels because the average irradiance of the panel, rather than the highest discrete irradiance, may determine the optimal placement of the panels. Different heatmaps may be generated for peak irradiance, average irradiance, or even a weighted average irradiance relative to demand.

For example, if energy demand is known to be higher in the summer between the hours of 12 pm and 5 pm, the expected irradiance values at various locations on the roof during these times may be weighted higher than the irradiance values at the same locations during winter months or off-peak hours. Thus, a generated heatmap, may illustrate average irradiance values over a period of time adjusted for the energy demand at the various time periods. In such an embodiment, a heatmap displayed for a user and/or used to calculate solar panel placement may graphically illustrate the optimal location for solar panel placement taking into account existing obstructions, potential obstructions, time of day variations, day of year variations, and time-based energy demand.

Accordingly, an obstruction that prevents irradiance at a peak time (e.g., noon during a high-demand summer day) may have a greater impact on the generated heatmap and/or solar panel placement estimator than an obstruction that prevents irradiance at a low-demand time (e.g., 8 pm)—even if the actual decrease on received radiation is the same.

As previously noted, the effect on solar irradiation of an obstacle may vary with time. For example, a vacant lot can later become an obstructing structure. To account for potential obstacles, the operator and/or the system may make reasonable predictions. For example, zoning restrictions may regulate the type of structures available for a vacant lot. In some examples, the county or a builder may make available the plans for the vacant lot. Using this information, the heatmap may make future predictions about the expected solar exposure at the site. The ability to assess adjacent or neighboring lots for potential obstacles (e.g., obstacles not present but planned in the future), as well as for existing off-site obstacles, enables the system to capture information in the heatmap that a trained technician may have difficulty recognizing or modeling.

For example, a wide variety of obstacles may affect the heatmap. Obstacles to solar irradiation may include but are not limited to, trees, shrubs, satellite and other communication dishes and antennas, poles, chimneys, other buildings, orientation, gables, air conditioning/heating units, and/or other objects. Also, obstacles may change over time. A tree or shrub may grow. An undeveloped lot may become a building that obstructs solar exposure. The variety of obstacles, both present/current and future/potential, may generate a complex heatmap along the surface of a roof. Shadows cast by obstacles may interfere with one another. Even a trained, skilled technician may not foresee how shadows from obstacles may interfere with one another. For example, obstacles may overlap for some lengths of time and create different shadows at other times. The interference and combination of current and potential future shadows may further complicate the heatmap.

For example, the zoning and/or size of an adjacent proposed building may affect the future amount of energy flux, or irradiance received at a target location. For example, a two-story building in a zoned residential neighborhood may not adversely impact the site on a rooftop. The heatmap, or FEM, may reflect little to no adjustment. The recommended placement of solar panels may not substantially deviate due to a small (e.g., two-story) building in a neighboring lot. Whereas a large (e.g., four-story) building may substantially interfere with optimum solar panel placement. The heatmap may encode and/or display all this information in a graphical user interface. In some embodiments, a user may toggle certain effects on and off. For example, a user may prefer to view a heatmap based on all existing obstacles and omit the effects on the heatmap of potential obstacles. The operator and/or system may then use the heatmap (or data to generate the heatmap) to determine a suitable or optimal placement of the solar panels.

The proposed size and/or construction material of a neighboring structure may adversely affect the irradiance at a site. The shadow from the structure may occlude solar exposure and cast a shadow on the location of solar panels. For example, an adjacent property with a four-story apartment building may occlude more light than a two-story structure. A vacant lot may require further investigation to determine whether the lot is zoned for a two-story, three-story, or four-story building. The system may modify a solar panel layout design based on the zoning laws and ordinances and/or a proposed construction plan. For example, the heatmap may reflect the future adversely affected exposure for a part of the roof where the zoning of a vacant adjacent lot permits a four-story building. Although the lot is currently vacant, the heatmap may compute an expected shadow based on setback requirements, zoning laws and regulations, ordinances, building plans, and/or other construction requirements. Based on the altered heatmap, the UAV solar evaluation system may recommend locating the solar panels in locations that are less affected by the expected building.

Similarly, in the northern hemisphere, a building to the north of structure with a reflective surface (e.g., large windows) may actually increase solar exposure on north-faces slopes of a building. Accordingly, the system may estimate or measure an increase in solar irradiance caused by reflected sunlight from neighboring structures.

The UAV-based solar irradiance assessment system may utilize various user inputs to determine a solar panel layout. User-specified goals for daily, monthly, or annual solar collection may be used to determine the number of panels needed and an optimal placement for the panels. Alternatively, as a user digitally places solar panels on a displayed model of the roof, the system may show the user how many kilowatts will be generated per hour, day, week, month, year, lifetime, etc. For example, a 300-watt solar panel in one location on the roof may be expected to collect 100 watts early in the morning, 300 watts in the afternoon, and be shaded in the later afternoon and evening. The panel in such a location may be expected to generate 1.6 kW per day, for example. The same panel in a more optimized location may generate nearly the full 300 watts for most of the day for a total of around 2.8 kW per day.

Thus, in some embodiments, a user may place panels with known specifications and the system may inform the user of the total expected solar collection at a peak time, per day, per hour, per month, per year, etc. In other embodiments, a user may specify that they want to collect an average of 7.2 kW per day. The system can identify the number of panels and placement necessary to achieve a daily average of 7.2 kW on an annual basis or a monthly basis. In another embodiment, the user may specify that they desire no less than 7.2 kW on any given (sunny) day. This would likely require more panels to compensate for the lower angle of the sun during winter months. In various embodiments, the system may provide solar layout design specifications that include the total number of panels, the number of panels connected in series, the number of panels connected in parallel, the gauge of wire needed, the number of branch connectors, the number of maximum power point tracking (MPPT) controllers, the number of inverters, the number of batteries, the number of transfer switches, etc.

In other embodiments, the system may recommend a number of panels based on a desired payoff or break-even date at a given price per kilowatt-hour and price per kilowatt of installation. Solar panels placed in locations with the maximum sun exposure may generate sufficient solar power to cover the cost of installation very quickly (e.g., two years), while solar panels placed in partial shade may generate less solar power and take longer (e.g., eight years) to cover the cost of installation. A user may specify a desired break-even payoff period of, for example, 5 years, or a desired profitability over a 10-year period. The system may generate a solar panel layout based on the desired financial goal as well as the solar irradiance mapping produced in conjunction with the UAV scanning.

In some embodiments, the UAV solar irradiance assessment model may include a GUI that allows an operator to select a threshold for the panels to be installed. The operator may input a minimum irradiance for the system and an acceptable panel size. The system may generate recommended locations of the selected solar panels on the structure. In one embodiment, a user may toggle a box for acceptable sizes of the solar panels. For example, the operator may select a panel type from a drop-down menu or select specific panel sizes that are available (e.g., 2'×4', 3'×5', etc., or other size panels including non-rectangular shapes). In some embodiments, a user may select all available panel sizes and allow the system to return the best design to capture the highest level of solar exposure and/or highest level of solar exposure within financial constraints (e.g., a break-even or profitability goal). Once selected, the system may generate the ideal locations for installing the panels.

In addition, the solar exposure system may recommend an angle of the panels relative to the roof and/or account for and recommend solar-tracking solar panel mounts (i.e., mechanically rotating solar panel mounts). In some embodiments, a user may specify limitations for aesthetic reasons. For instance, a user may want only low-profile solar panels or avoid solar tracking mounts.

The user may input threshold angles of the panels relative to the roof and/or a default range of angles may be presumed to be available. The heatmap generated by the system may account for these possible or expected angles. The angle relative to the roof of a solar panel may affect the heatmap. User specification of available or acceptable angles may be used to update a heatmap and/or expected output of a specific solar panel layout. For example, an angled panel may enable areas formerly in a shadow to receive greater sunlight. The operator and/or the system may establish practical limits to the acceptable angles. For example, the GUI may ask the operator to set a limit to the recommended angle of the solar panels relative to the roof.

The solar exposure system may include a network of components and modules that interact to generate the heatmap and/or the optimum placement of solar panels on the roof. For example, the solar exposure system may include a non-transitory, computer-readable medium for storing instructions. The system may store the instructions in memory, and a processor may implement various modules to accomplish calculations and tasks performed by the system. The processor may be located on the UAV or may be remotely connected through a network and/or network interface. The network interface may enable communications of one or more operations to the UAV pre-flight, post-flight, and/or during flight.

As an example, but not by way of limitation, one or more computer-readable storage mediums of local and/or remote systems may include: a scanning module, a navigation module, a risk zone generator, a tag reading module, an irradiance module, an obstacle module, an estimator module, and/or other modules to perform the operations and methods described herein. The system may include each module on the UAV, off the UAV, or in a system on and off the UAV and/or connected through a network. For example, the network may connect some of the modules located on the UAV with others connected remotely through the network.

The scanning module may include detailed scans of complex areas or locations where additional data is required. For example, the scanning module may determine the pitch of a roof, identify hazards, find obstacles obstructing solar irradiation, locate potential future obstructions to solar irradiation, measure distances to such obstructions, and/or otherwise identify and scan detailed obstructions or target areas of the subject property. In some embodiments, the scanning module may determine the time of day, the angle of the sun, the sun's trajectory, and historical scans for correlating a scan to annual predictions of irradiance.

The scanning module may predict an expected length of time for which obstructions will occlude solar exposure, the total period of time for which a target location will receive solar exposure, and/or the total irradiance at the target location for a period of exposure time. For example, the scanning module may base the expected period of exposure on the scanned angle of irradiance, the measured level of irradiance at the target location, the distance measurement to any obstacles, and/or the length of time of any obstructions to the irradiance.

An obstacle module may calculate obstructed irradiance at the target location of a roof. For example, the obstacle module may identify a scanned obstacle, predict the length of time the obstacle may occlude solar exposure at the target location, and determine the extent of the solar exposure blocked by the obstacle. The calculation may determine solar irradiance as a power measurement (e.g., W or kW), as a flux measurement (e.g., $kW/m^2$), or as a length of time (e.g., seconds, minutes, hours, or days).

The solar exposure system may include an estimator module. The estimator module may use historical data to estimate cloudy, rainy, and/or snowy lengths of time that occlude solar exposure. The estimator module may compute a heatmap of the solar irradiation on the roof or at the subject site. The heatmap may identify optimal locations for the placement of solar panels and/or the optimal size of the solar panels. The estimator module may also indicate a recommended angle or orientation of the solar panels relative to the roof. The estimator module may determine optimal panel placement on the heatmap based on the recommended angle of the panels. The estimator module may calculate and return a recommended solar panel size, angle, and/or location of the solar panels to the user interface.

Some of the infrastructure that can be used with embodiments disclosed herein is already available, such as general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. A network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory, computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1 illustrates a GUI 100 for inputting a subject property 102 for investigation. Subject property 102 may include any site, including a vacant lot, a house 103, a roof, and/or any other structure for solar panel installation. For example, a user input 104 may include selecting the house 103 on subject property 102. The user input 104 may select the subject property 102 for analysis of solar panel installations. The GUI 100 may include a map, a satellite image, GPS coordinates, an address according to county records, and/or other identifying information. User input 104 may allow an operator to select a property, enter an address or GPS coordinates, and/or otherwise identify the subject property 102. The subject property 102 may have many obstacles to solar irradiance (e.g., on a roof of the subject property 102). For example, the subject property may border a retaining wall 106 and a neighboring property 108. In some embodiments, neighboring property 108 may be a house. In other embodiments, neighboring properties 108, high-rise office or residential building 110 and/or a commercial building 112 may impact solar irradiance. Commercial building 112 may include, for example, a grocery store, a shopping mall, a warehouse, an industrial building, and/or any other building used in commerce.

Figure 2:
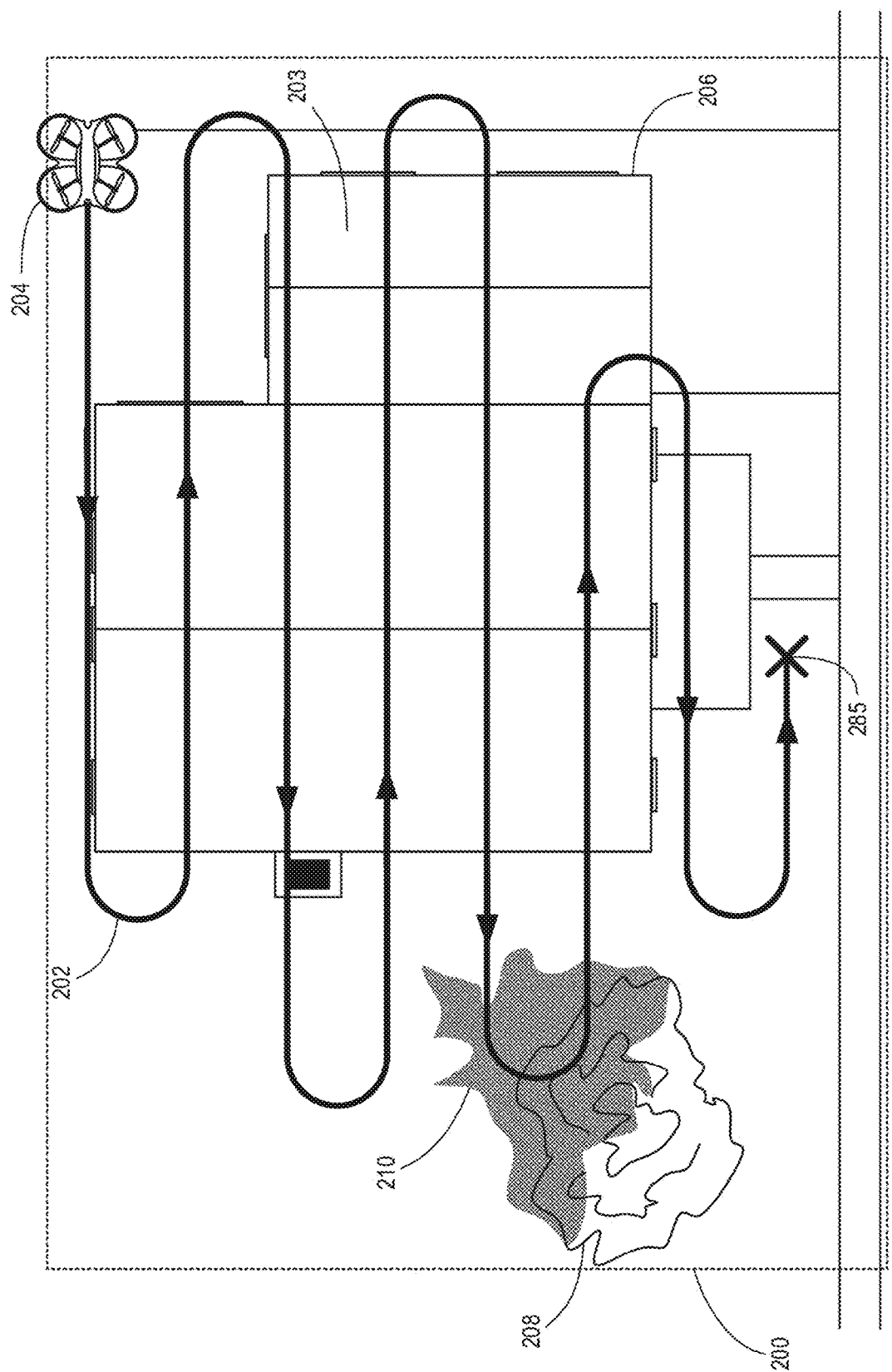
FIG. 2 illustrates an example of a boustrophedonic flight pattern of an unmanned aerial vehicle (UAV) over a structure.

FIG. 2 illustrates a boustrophedonic flight pattern 202 over house 203. The boustrophedonic flight pattern 202 involves multiple scans in opposite directions. The boustrophedonic flight pattern 202 may slightly offset each scan or pass. For example, a second scan may be slightly offset from the first so that some of the data in the scans may overlap and give context for joining the scans into a complete scan of the subject property. The operator may input or define the boustrophedonic flight pattern 202 over any portion of subject property 102, including the house 203 illustrated in FIG. 2. The unmanned aerial vehicle (UAV) 204 may capture images, scan for data, and/or make measurements during the flight. The operator may pre-program the boustrophedonic flight pattern 202, or the operator may limit the boustrophedonic flight pattern 202 to set boundaries 200 (e.g., the house 203 and/or the subject property 102 may provide the input boundaries).

In some embodiments, the UAV 204 may slightly exceed the set boundaries 206 or the set boundaries 206 may change when UAV 204 detects an obstacle 208. For example, in FIG. 2 the UAV 204 may slightly exceed the set boundaries 206 when the UAV 204 detects a tree 208. The UAV 204 may capture data, take pictures, and/or make measurements of the tree 208 and the shadow 210 cast by the obstacle (e.g., tree 208). For clarity, FIG. 2 only depicts eight boustrophedonic passes; however, a boustrophedonic flight pattern 202 may include additional or fewer passes. The actual number of passes may vary based on the size of the roof or site analyzed, elevation of the UAV 204, the desired detail, sensor field of view (e.g., camera zoom), desired overlap of captured images, and/or other variables. Similarly, the flight path 202 may not extend to the set boundaries 206 of the subject property 200 (or roof of house 203) but may extend just beyond or just short of the boundaries of the subject property 200 (or roof of house 203).

Figure 3:
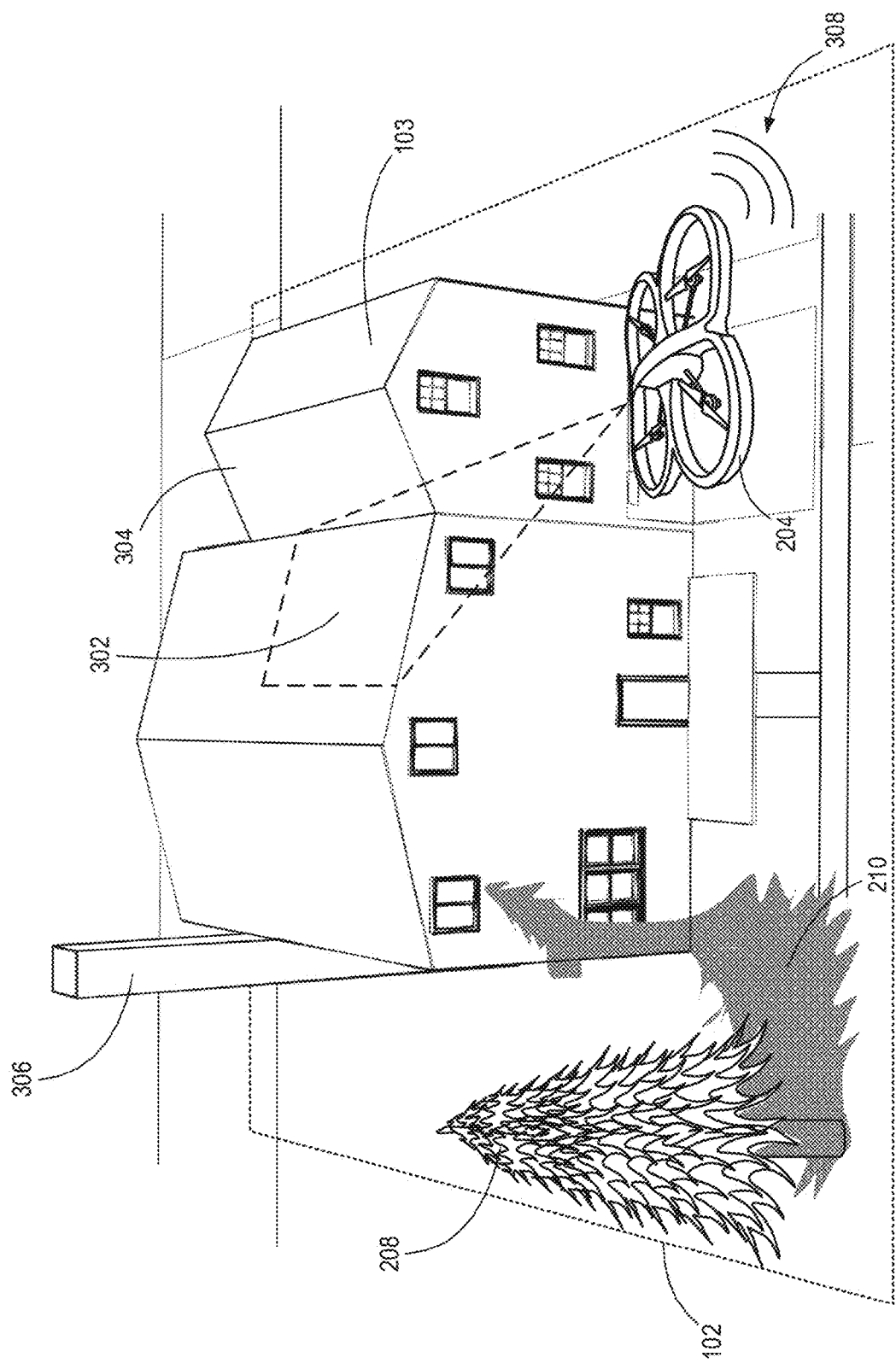
FIG. 3 illustrates an example of a scan of a portion of a planar roof section of a structure.

FIG. 3 illustrates UAV 204 analyzing a target location 302 (e.g., a planar section) of roof 304. The target location 302 of roof 304 may be part of a boustrophedonic flight pattern 202 (e.g., as shown in FIG. 2) or as part of a microscan of a detailed section of roof 304. For example, the detailed microscan of a target location 302 of roof 304 may analyze various obstacles to the solar irradiance at the detailed section of roof 304. The UAV 204 may capture images of the shadow 210 of a tree 208. Based on the time of day, the UAV 204 system may also identify obstacles that are not casting shadows. For example, chimney 306 may obstruct the target location 302 area during certain times of day even though it does not currently cast a shadow on that area during the scan. Similarly, other sections of roof 304 may obstruct the solar irradiance at the particular microscan target location 302. Gables, adjacent sloped roofs 304, the direction of the roof 304 relative to the trajectory of the sun, and/or other factors of the roof 304 may affect the solar irradiance at the analyzed microscan target location 302.

In some embodiments, the system may connect UAV 204 through a network signal 308. The signal 308 may provide inputs and/or outputs to UAV 204. For example, the signal 308 may directly control the flight of UAV 204. The system may pre-program a particular flight pattern for the UAV, identifying target locations 302 for microscans. Similarly, UAV 204 may output data, photographs, video, measurements, and/or other outputs to the system network via signal 308. Signal 308 may transmit data in real-time following a particular scan (e.g., microscan of target location 302) or following the complete flight pattern to allow time to compile and assimilate the scanned data.

Figure 4:
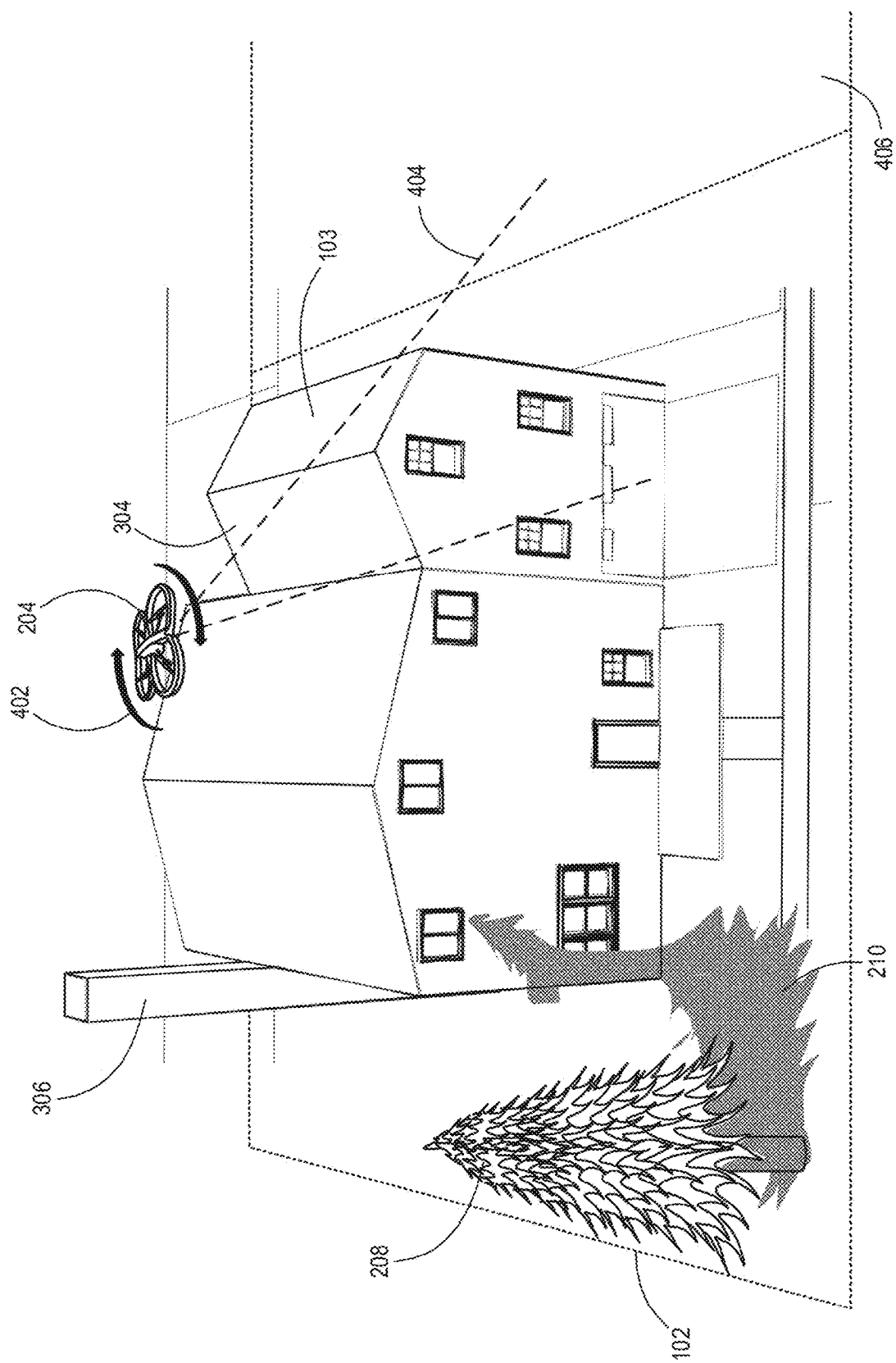
FIG. 4 illustrates an example of a UAV performing a 360-degree panoramic scan of a region proximate the structure to identify actual and/or forecasted obstructions.

FIG. 4 illustrates the UAV 204 at a top and near-middle location of house 103. In this location, UAV 204 may perform a 360-degree spin 402 to obtain a panoramic capture 404 of surrounding buildings, trees, and other obstacles. As shown in FIG. 4, the angle of the scan is approximately 5 degrees, but the operator may select any angle for a panoramic scan 404. Panoramic scan 404 may capture surrounding obstacles and scan for future obstacles. For example, panoramic scan 404 may include a scan of vacant neighboring parcels 406. The system for determining solar exposure at designated locations may determine the zoning of the vacant parcel 406 and calculate an estimated obstruction by any future construction on that parcel. For example, the system may access county records, construction plans, zoning ordinances, and/or other relevant information to estimate a period of time a future obstacle on vacant parcel 406 may obstruct one or more sections of roof 304. Panoramic scan 404 may consider the expected growth of trees 208 and the potential future impact of shadow 210. The panoramic scan 404 may identify other obstacles. For example, panoramic scan 404 may identify obstacles such as chimney 306, telephone poles, satellite dishes, gables, roof orientation to the sun's trajectory, and/or other obstacles requiring microscans of target locations 302.

Figure 5:
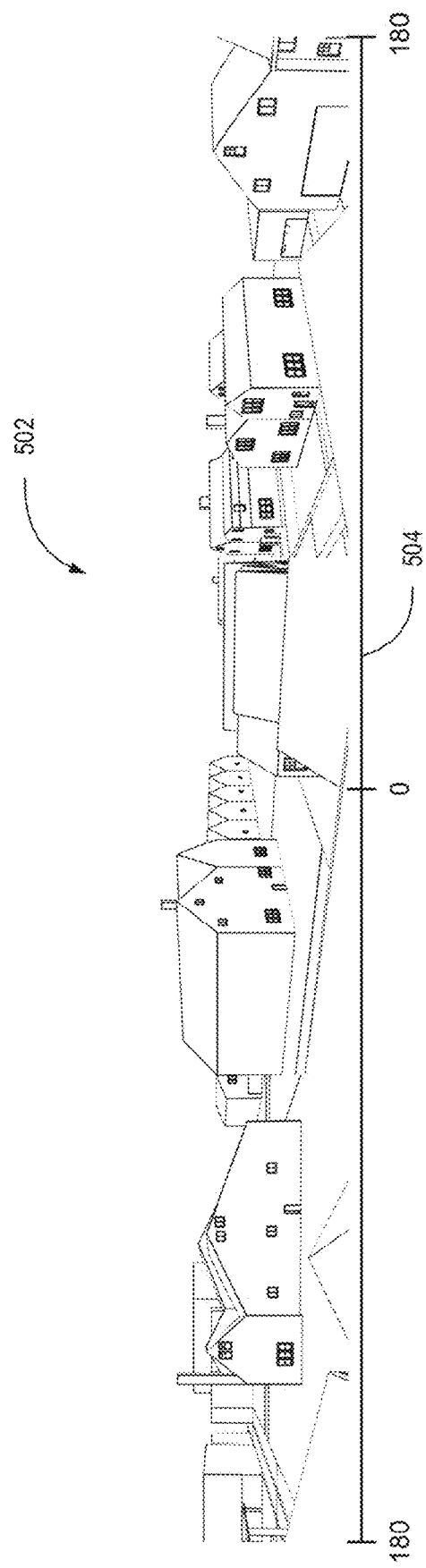
FIG. 5 illustrates an example of a rectangular representation of a panoramic image generated by a panoramic scan by a UAV.

FIG. 5 illustrates the data 502 captured in the panoramic scan 404 of FIG. 4. The panoramic scan 404 may provide a panoramic image capture 504. Panoramic image 504 may be in rectangular form representing a 360-degree spin 402 of a camera attached to UAV 204 (e.g., as illustrated in FIG. 4). The system may use image 504 in conjunction with detailed microscans of target locations 302 on roof 304, as illustrated in FIG. 3.

Figure 6:
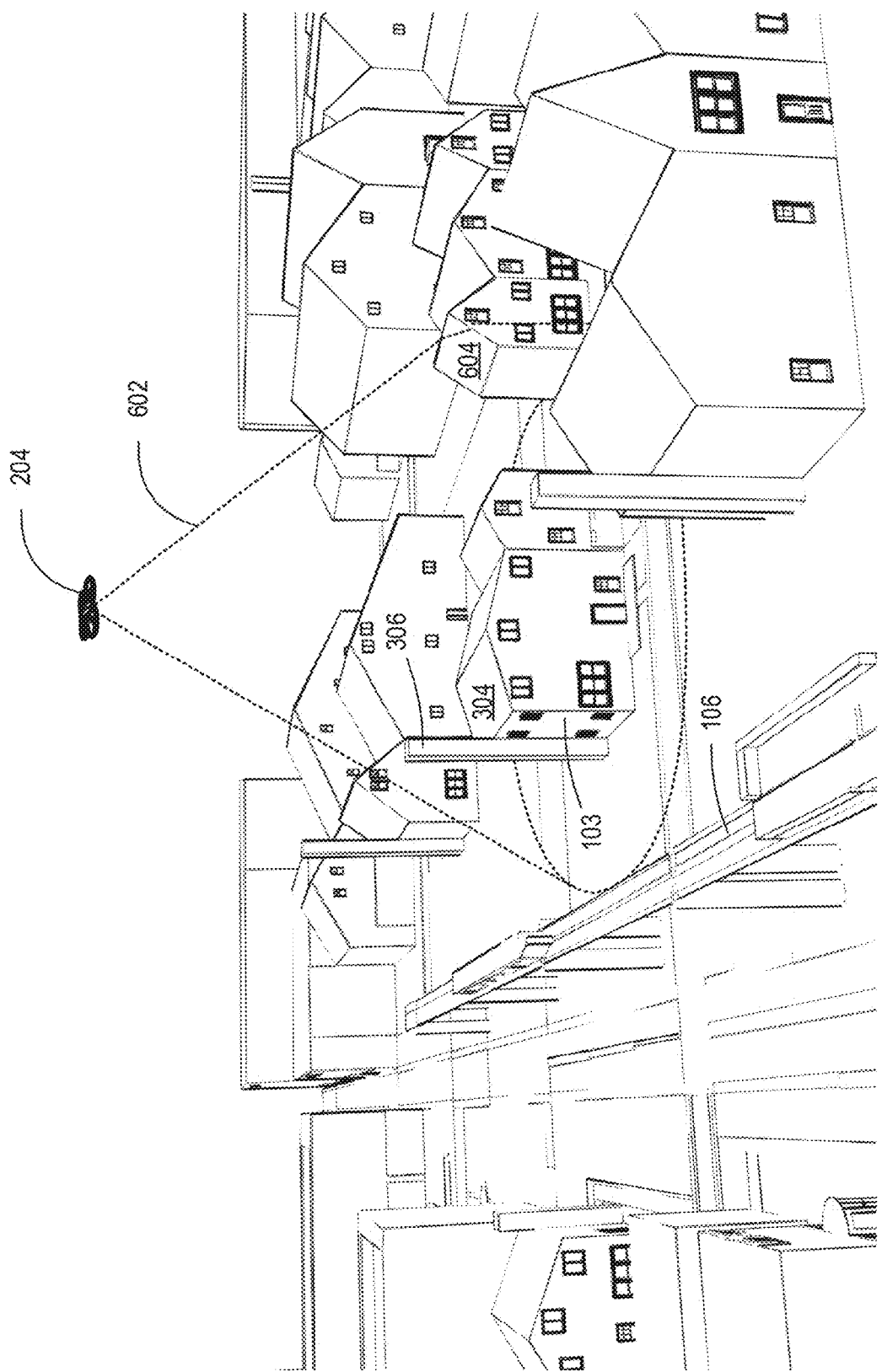
FIG. 6 illustrates an example of a UAV capturing a nadir scan of a structure.

FIG. 6 illustrates UAV 204 capturing a nadir image 602 of subject property 102 (from FIG. 1). The nadir image 602 may include the roof 304 of house 103 as well as obstructions on the neighboring property 604. Nadir image 602 may also capture other obstacles such as chimney 306 and wall 106 and locate areas for additional microscans of target locations 302. Nadir image 602 may identify obstacles on neighboring properties 604 such as buildings, trees, chimneys, and/or other structures that may interfere with the solar exposure received at roof 304. Nadir image 602 may identify locations of future or potential obstructions and may transmit and/or record these areas for further study. In some embodiments, the solar exposure system may locate or retrieve pertinent information such as the zoning of vacant lots and/or construction plans.

Figure 7:
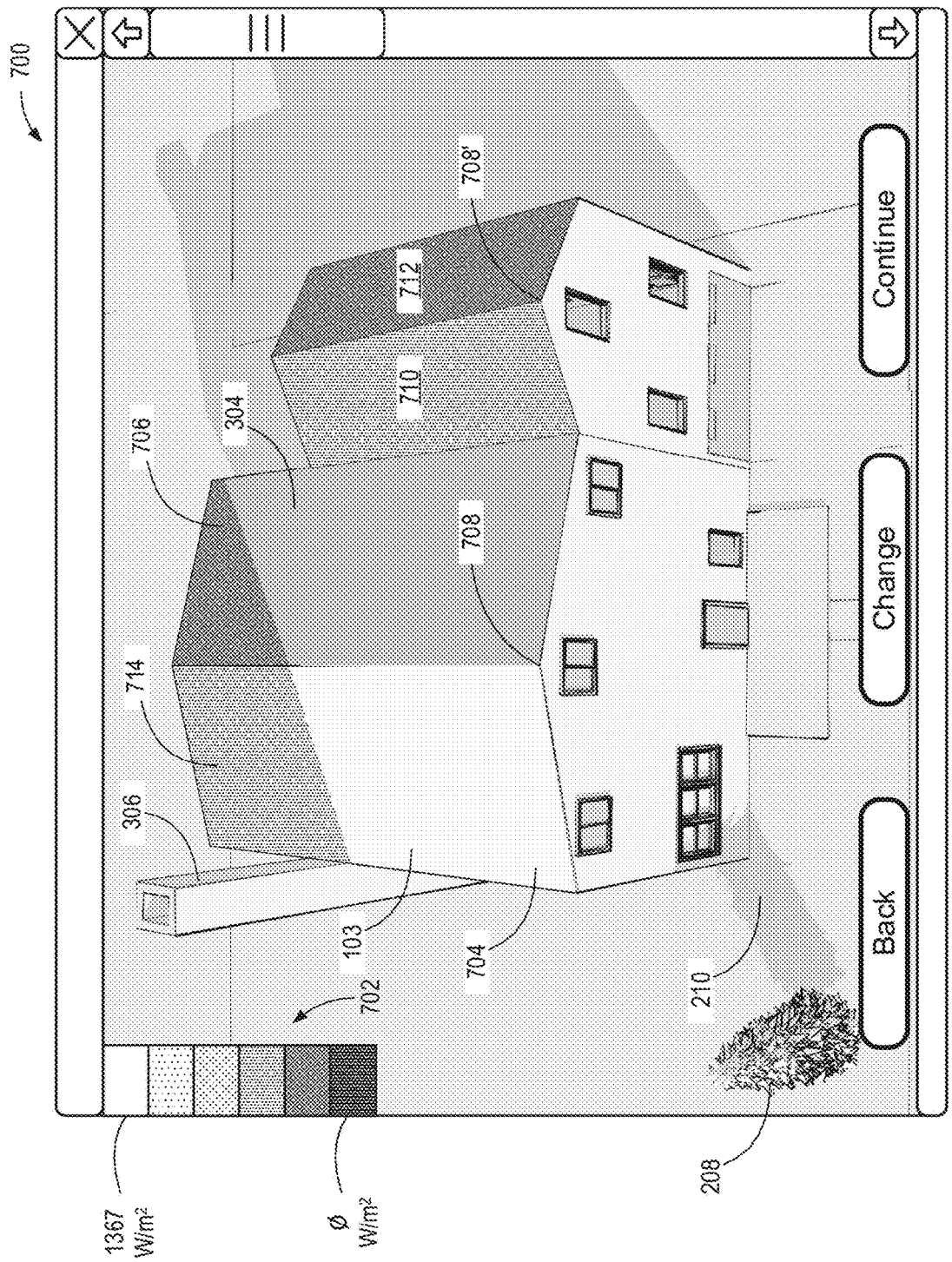
FIG. 7 illustrates a graphical user interface (GUI) with a spatial heatmap representing solar irradiance values on a roof of a structure, according to one embodiment.

FIG. 7 illustrates a GUI showing a heatmap 700 of the solar irradiance at various locations of the structure. The heatmap 700 includes a legend 702 identifying white area 704 as corresponding to the area with the highest solar irradiance and dark area 706 as corresponding to the region with the least solar irradiance. The legend 702 also indicates that the heatmap 700 varies in solar irradiance from 1367 $W/m^2$ (e.g., at white area 704) in the most irradiant portions to zero $W/m^2$ (e.g., at dark area 706) in the most obstructed portions. The system may round the irradiance down to zero for any region with insufficient light to activate a solar panel. FIG. 7 also illustrates how gables 708 and 708' can affect the solar irradiance at various locations along roof 304. For example, the solar irradiance at a location along a section of roof 710 is slightly less than the solar irradiance at white area 704 due to the obstruction of gable 708. At a location along a section of roof 712, both gables 708 and 708' may occlude solar exposure. Direct obstructions, such as chimney 306, may play an expanded role in the solar exposure throughout the day. Heatmap 700 allows for an averaged shadow 714 throughout the day. Thus, the averaged shadow 714 is shown having an area larger than the area of any actual shadow cast by chimney 306 at any point in time during the day.

Figure 8:
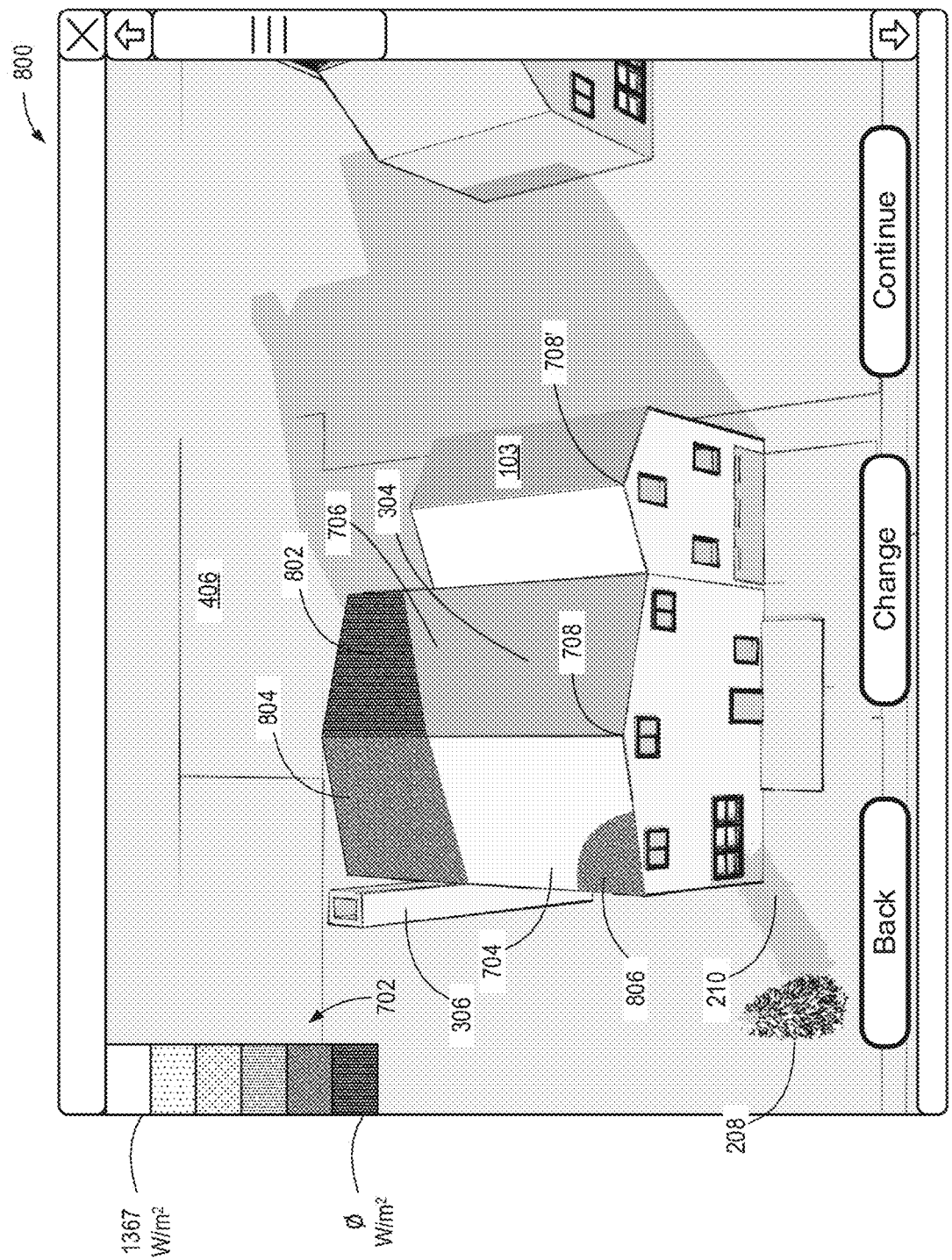
FIG. 8 illustrates a graphical user interface (GUI) with a spatial heatmap representing solar irradiance values on a roof of a structure, according to one embodiment.

FIG. 8 illustrates a GUI showing a heatmap 800 that accounts for future obstacles. A vacant lot 406 (e.g., to the west) and the tree 208 do not appear to be obstacles at the present time but may become obstacles at some future time. The heatmap 800 considers the features of these future obstacles through time. For example, the zone 802 considers the combined effect of the chimney 306, the gable 708, and a future building built on the vacant lot 406. The zone 804 considers the combined effect of the chimney 306, and the construction of a building within the zoning requirements on the vacant lot 406. The zone 806 illustrates the shadow 210 cast by the future growth of the tree 208. For example, the system may predict a shadow 210 for a more matured tree 208 (e.g., in five years). Thus, the system may account for and combine both present obstacles (e.g., the chimney 306 and the gables 708) and future obstacles (e.g., the vacant lot 406 and the tree 208) into a single heatmap 800.

In some embodiments, the system may estimate that every tree will grow a certain amount per year. In other embodiments, the system may use a standard growth rate model based on the current height of the tree (e.g., very small trees may be expected to grow at a relatively high rate per year, while very tall trees may be expected to grow at a relatively slower rate per year). In some embodiments, the system may include or connect with a tree variety identification subsystem. The system may thereby identify the variety of a detected tree and estimate a mature-sized tree. The estimated mature-sized tree may then be used to identify future or potential shadows on the structure.

In some embodiments, the tree variety identification subsystem may identify a tree variety based on the shape of branches, current height of the tree, current width of the tree, bark texture, bark pattern, bark color, foliage color, foliage shape, foliage size, needle size, needle clusters, fruit of the tree, flowers on the tree, cones produced by the tree, etc.

Figure 9:
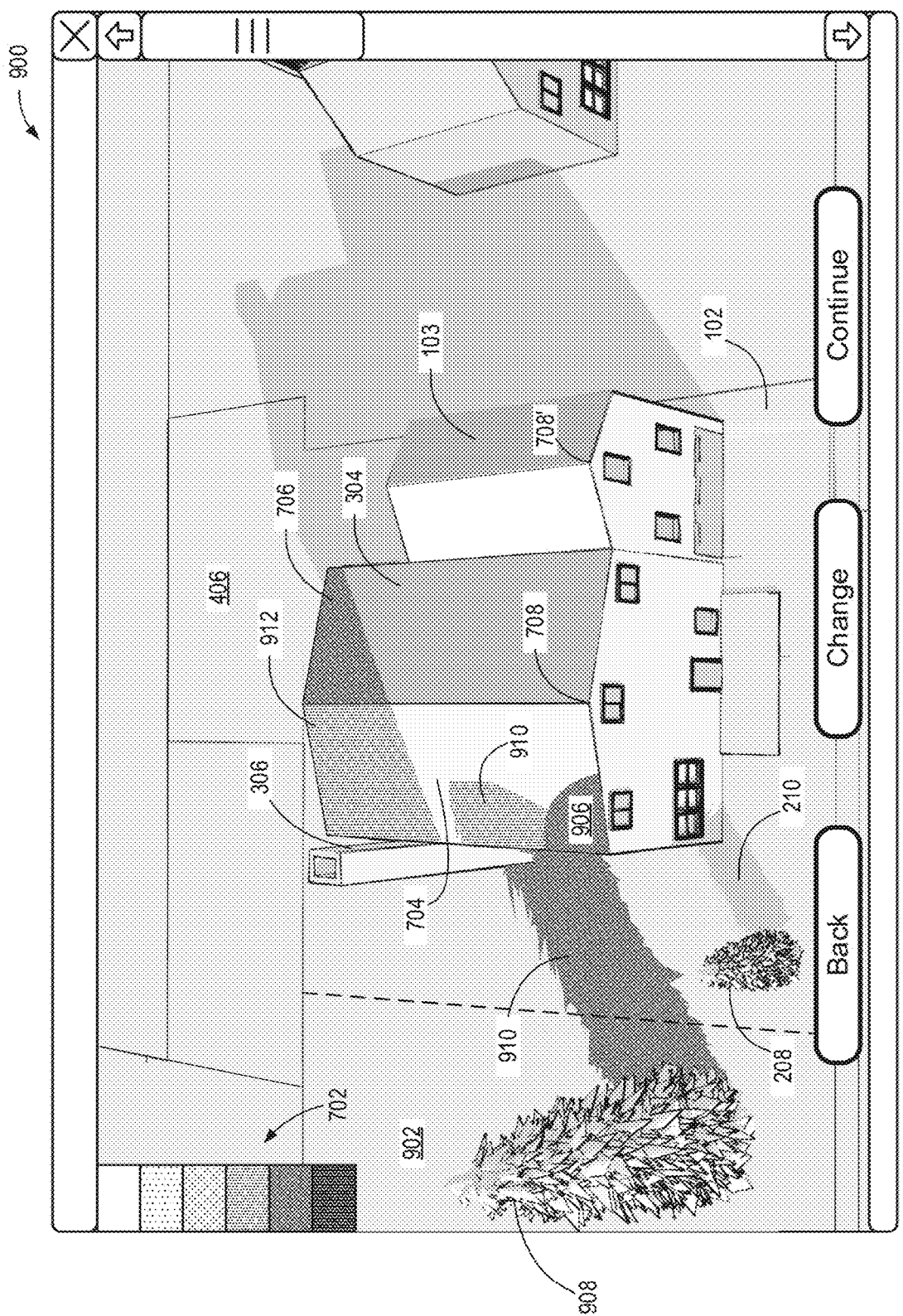
FIG. 9 illustrates a spatial heatmap showing a spatial distribution of average solar irradiance values temporally averaged over a predetermined time period, according to one embodiment.

FIG. 9 illustrates how obstacles on an adjacent lot 902 may affect heatmap 900. As in FIG. 8, the heatmap 900 may include present obstacles (e.g., the chimney 306 and the gables 708 and 708'), future obstacles (e.g., the shadow 210 from the mature tree 208 illustrated as the zone 906) and may include obstacles from neighboring adjacent lots 902. For example, the neighbor's tree 908 casts a shadow 910 on the zone 704 of the roof 304. In addition, the vacant lot 406 may create a future shadow in the zone 912 of roof 304. The heatmap 900 may combine these obstacles created by the neighboring lot 902 and future obstacles created by the vacant lot 406.

Figure 10:
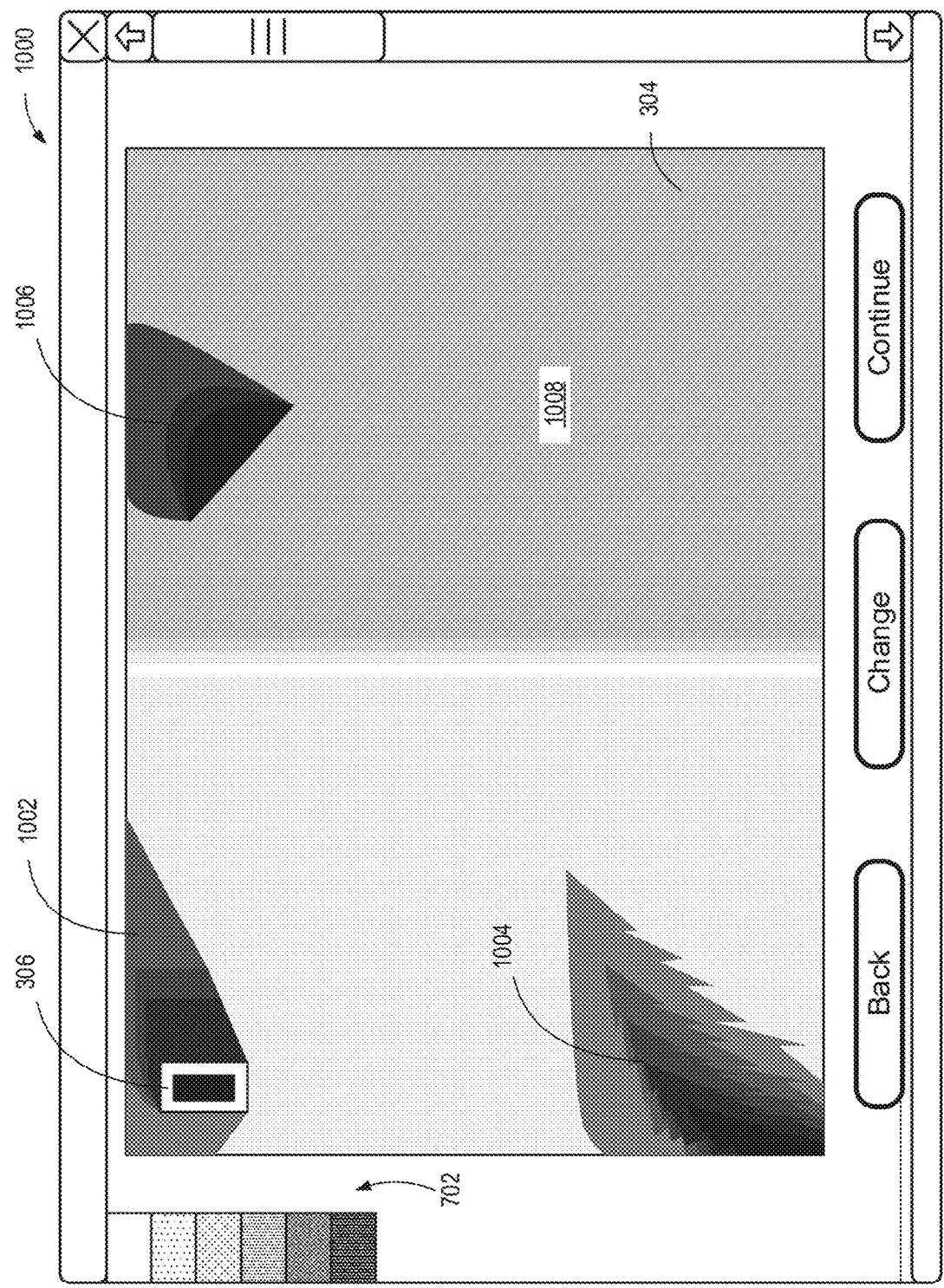
FIG. 10 illustrates an example of a spatial heatmap of an isolated section of roof showing temporally averaged solar irradiance values affected by obstructions, according to one embodiment.

FIG. 10 illustrates a detailed view of a complex heatmap 1000 representing a section of the roof 304. For clarity, FIG.

10 removes several features of the roof 304 to display an isolated heatmap 1000. The heatmap 1000 illustrates how a variety of obstacles may combine onto a single heatmap 1000. For example, obstacles may include obstacles on the rooftop 304 (e.g., chimney 306), external to roof 304 (e.g., on subject property 102), and/or on neighboring lots 902. Obstacles may include but are not limited to, trees, satellite dishes, satellite antenna, power lines and poles, cellular towers, chimneys, buildings, attic vents, plumbing vents, the orientation of the roof, the structure of the roof, gables, and other obstacles that obstruct solar irradiation. The heatmap may become quite complicated based on the variety of obstacles to solar irradiation. However, heatmap 1000 may combine the obstruction caused by all these obstacles. The heatmap 1000 may provide a visual tool for a user to determine the placement for solar panels and/or the system may auto-generate placement recommendations/options. Even if part of the panel may at times become obstructed, the system may determine that placement in a partially obstructed location satisfies system parameters.

Figure 11:
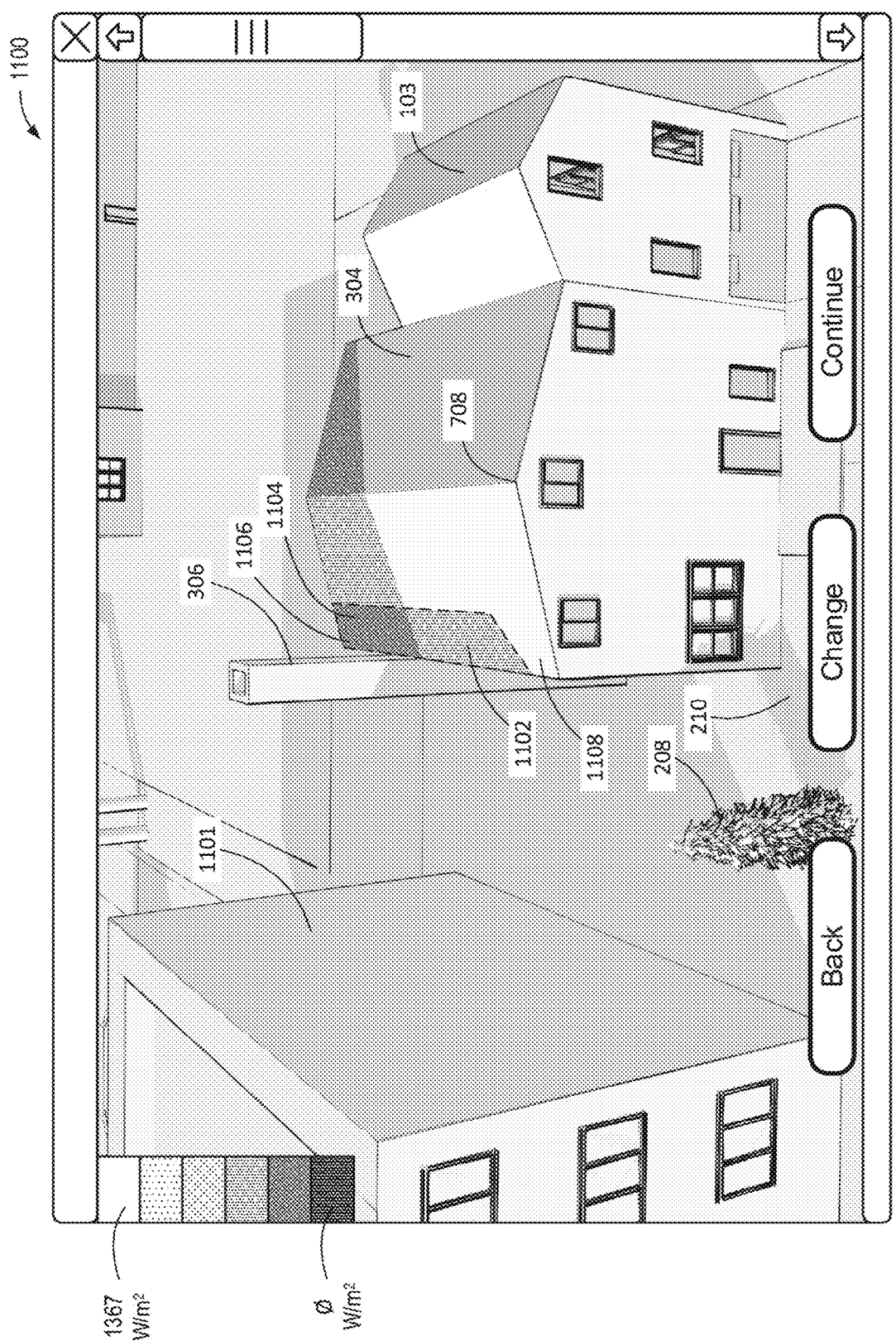
FIG. 11 illustrates a spatial heatmap of temporally averaged solar irradiance values on a roof of a structure affected by various obstructions, including a nearby building.

FIG. 11 illustrates a GUI including a heatmap 1100 of a roof 304 showing the effects of a neighboring three-story building 1101. For example, the three-story building 1101 casts a shadow 1102 on roof 304. Shadow 1104 combines the effects of shadow 1102 cast by three-story building 1101 as well as the shadow cast by chimney 306. This combined shadow 1104 relocates the minimum exposure location 1106 to an area adjacent to the chimney 306. The maximum exposure location 1108 remains in the same area (e.g., compare location 1108 to the maximum exposure location 704 in FIG. 7). Although maximum exposure location 1108 did not change, the optimal placement of solar panels may not be in this location due to the shadow 1102 cast by three-story building 1101. Heatmap 1100 provides an analytical method for determining the optimal placement of solar panels by considering not just the locations of maximum and minimum exposure (e.g., locations 1106 and 1108), but also the average solar exposure at all locations across the panel. In addition, heatmap 1100 allows for contemplation of future complexities in the placement of solar panels. For example, although shown as an actual building, three-story building 1101 may be a model created by the system to depict future developments or zoning on an adjacent vacant lot.

Figure 12:
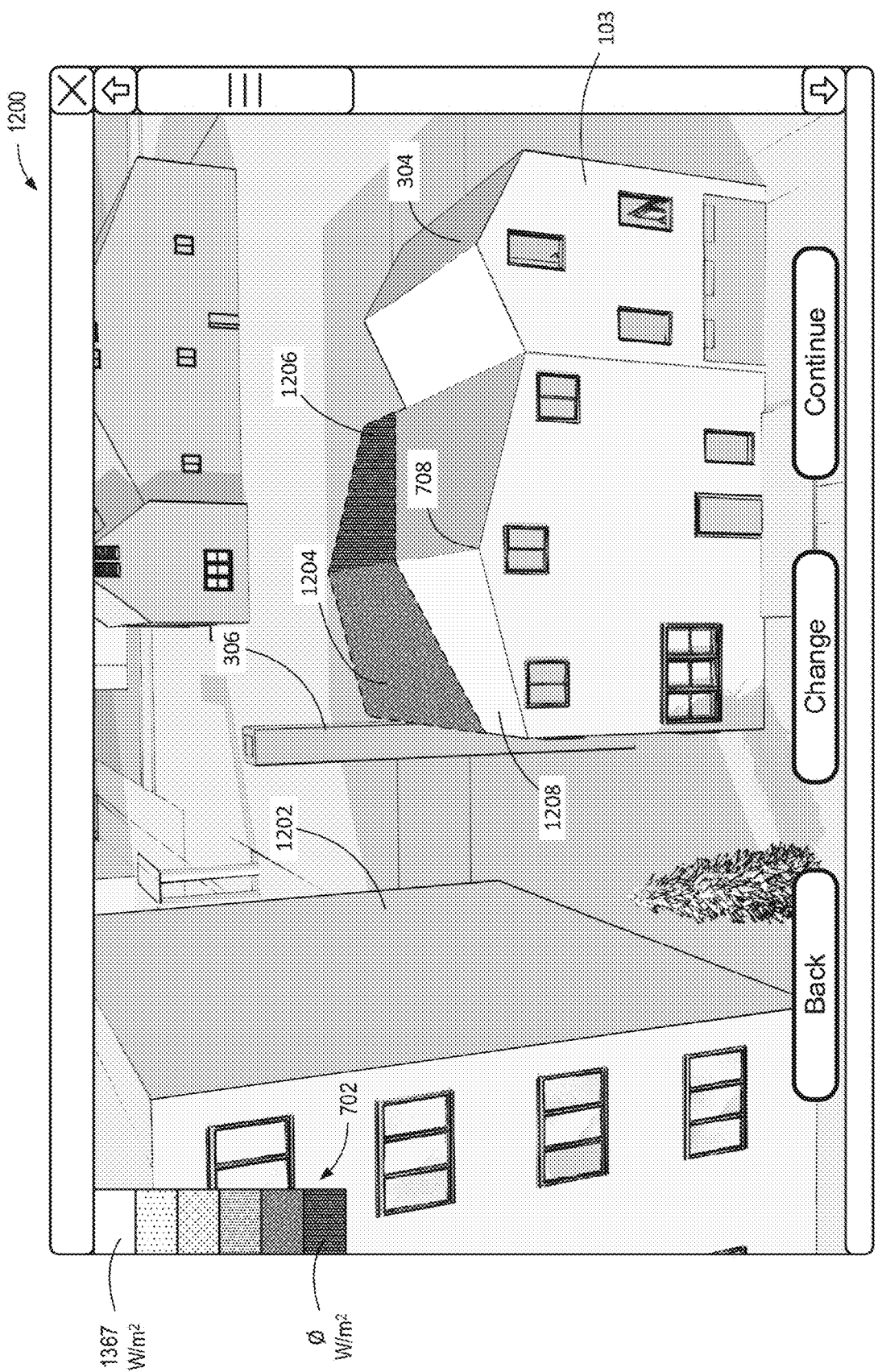
FIG. 12 illustrates a spatial heatmap of temporally averaged solar irradiance affected by a neighboring four-story apartment building.

FIG. 12 illustrates a GUI showing a heatmap 1200 generated by a four-story building 1202. As shown on heatmap 1200, the obstructed effect of chimney 306 and four-story building 1202 may combine into a large shadow 1204. The minimum solar exposure at location 1206 includes the effects of chimney 306, four-story building 1202, gable 708 and the orientation of roof. Although the maximum exposure location 1208 remains the same (e.g., compare location 704 in FIG. 7), the system may not recommend solar panels in this location due to the large shadow 1204 created by building 1202. Heatmap 1200 provides an analytical framework to analyze each finite element of heatmap 1200 and calculate the optimal placement of solar panels along roof 304. For example, although legend 702 still indicates a maximum exposure of 1367 W/m$^2$ at location 1208, that level of irradiance may not be possible at the optimal location of the solar panels due to large shadow 1204. The system may suggest angled panels (e.g., on the other side of gable 708) or alternative placement locations that receive less than optimal irradiance but have the highest average irradiance. Although depicted as an actual building 1202 in FIG. 12, the solar exposure system may approximate a four-story building 1202 based on the zoning of an adjacent vacant lot to create shadow 1204. Therefore, heatmap 1200 may consider the effects of real and/or potential future obstructions (e.g., buildings) on an adjacent vacant lot.

Figure 13:
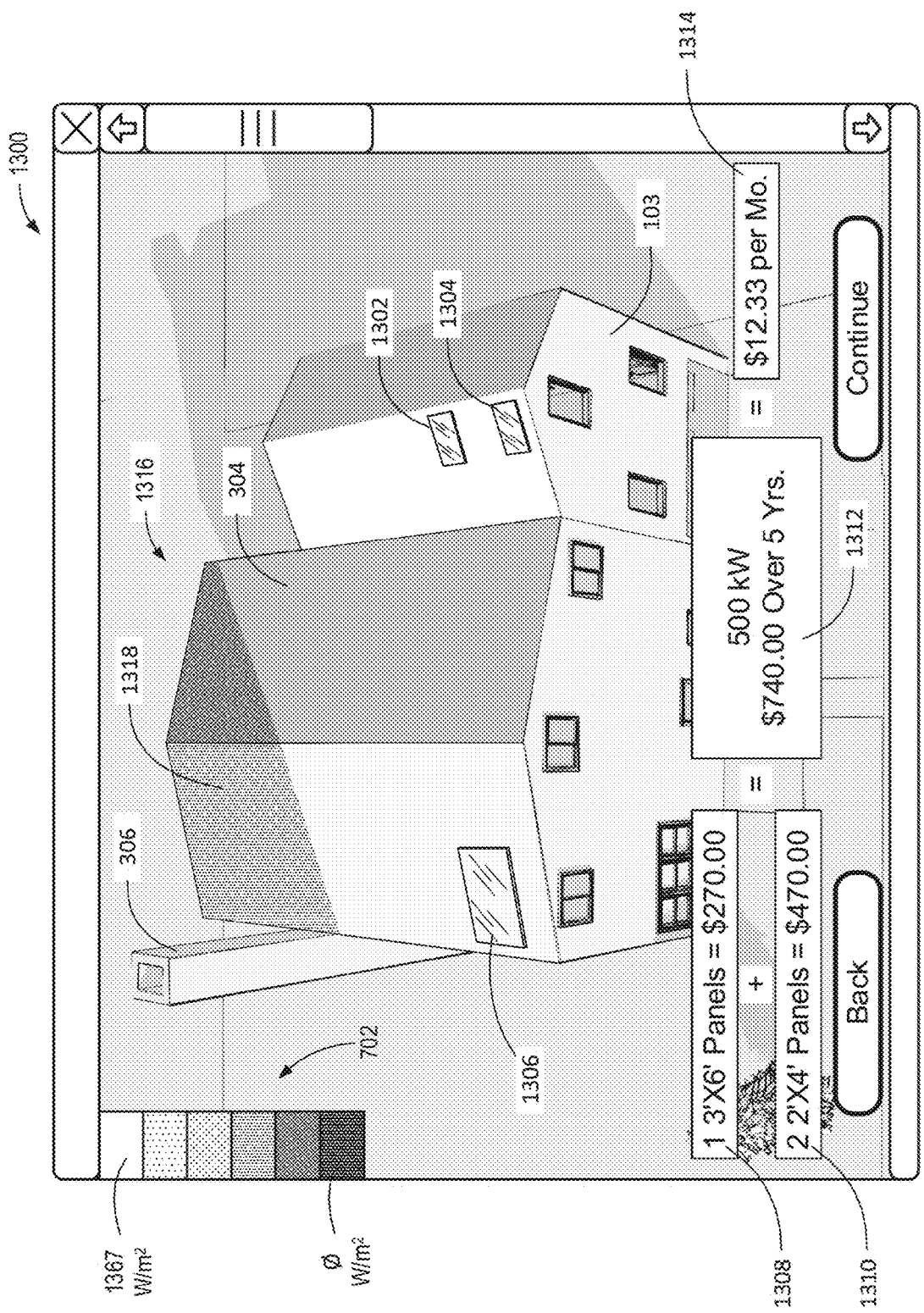
FIG. 13 illustrates an overlay recommendation of solar panel placement based on temporally averaged solar irradiance values calculated for a roof of a particular structure, according to one embodiment.

FIG. 13 illustrates a GUI 1300 of a solar irradiance assessment system. The solar irradiance assessment system may recommend locations 1302, 1304, and 1306 for solar panels based on a user-input size of solar panels, e.g., inputs 1308 and 1310. The user inputs 1308 and 1310 may include the size and quantity of panels, the threshold limit 1312 of the system, the cost per period 1314 for the system, and/or other user-defined data. The solar irradiance assessment system may recommend placement of a particular size panel (e.g., 3'×6' panel 1308) in a specific location 1306 on the roof 304. The solar irradiance assessment system may recommend placement of multiple panels 1302, 1304, and 1306. The system may generate a heatmap 1316 and/or "stay-out" regions 1318 for the panels based on one or more obstacles (e.g., chimney 306). The recommended placement of panels 1302, 1304, and 1306 may depend on user inputs such as the cost, size, number, threshold limit 1312, the cost per period 1314, and/or other user inputs.

In some embodiments, the user interface may display a heatmap 1316. The heatmap 1316 may identify stay-out regions 1318 for solar panel placement. The heatmap 1316 may represent an average solar distribution of irradiance for a period of time, such as a year. The system may base the estimated distribution of solar irradiance on historical irradiance data. For example, the system may use the solar irradiance of the past year (or an average of the last five, ten, twenty or other plurality of years) to determine recommended panel sizes 1308 and 1310 and/or solar panel locations 1302, 1304, and 1306. Heatmap 1316 may provide a graphical recommendation of panel placement, as illustrated. Heatmap 1316 may provide numerical irradiance data for the system to calculate panel placement.

For example, if the operator sets a 500-kW threshold limit over a period of five years (e.g., 100 kW/year), the system may generate a heatmap and recommend one or more suitable panel placements. The system may determine a quantity and location for solar panels to allow for a purchaser to fully offset an installation cost (e.g., based on saved electricity or electricity sold to another entity) within a prescribed time period (e.g., 7 years) at expected or current energy rates.

A GUI 1400 is illustrated in FIG. 14. The interface 1400 allows the user to select a panel size 1402 and quantity 1404, and the system will generate the watts produced 1405 and the price of the panels 1406. For example, the operator may select a specific size panel 1402 and a quantity 1404 of each panel. The system may auto-populate the watts produced 1405 and price of the selected panels 1406. In some embodiments, the operator may select all available panel sizes. This selection may permit the system to return a recommended optimal design to maximize solar exposure. The system may generate the quantity, size, price, and/or locations of the panels.

In some embodiments, the system may total the quantity of panels 1408, the watts generated 1410, and the total price 1412. The user may input a desired payoff period 1414, and the system may generate a cost per month 1416. A person having ordinary skill in the art would recognize other variations on user inputs and system outputs.

Figure 15:
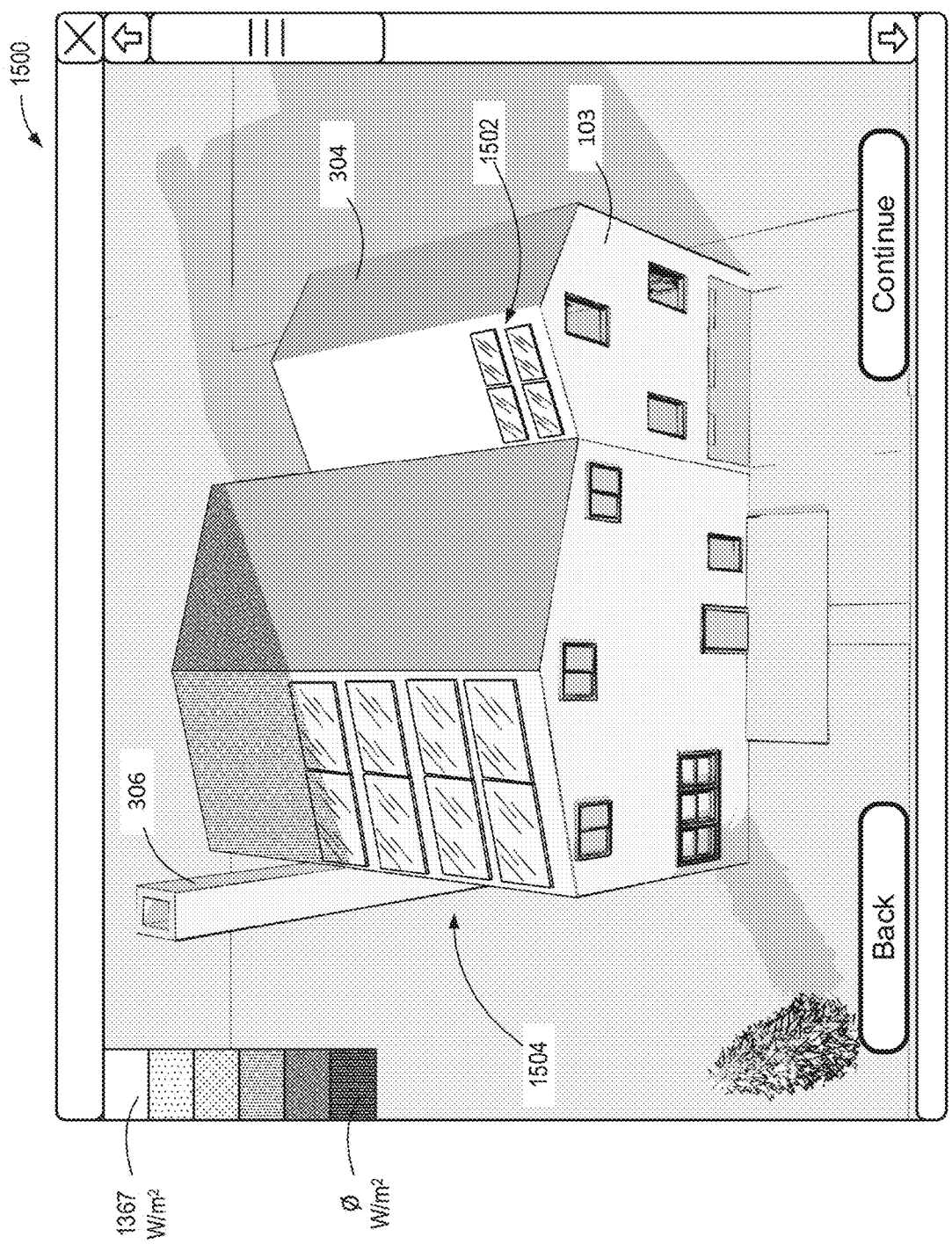
FIG. 15 illustrates an overlay recommendation of solar panel placement based on temporally averaged solar irradiance values and user-specified solar power system specifications.

FIG. 15 illustrates a GUI 1500 for a solar placement system with the placement of panels of various sizes based on user input. The user may specify a total desired output and the system may generate an optimized or suitable panel placement recommendation. Alternatively, the system may provide total output values, payoff values, estimated costs, etc. as an operator virtually places solar panels on the roof with the overlaid irradiation values (e.g., via a drag and drop operation) at locations 1502 and 1504. The system accounts for the decreased irradiance expected for solar panels placed within shadowed areas, as described herein.

Figure 16:
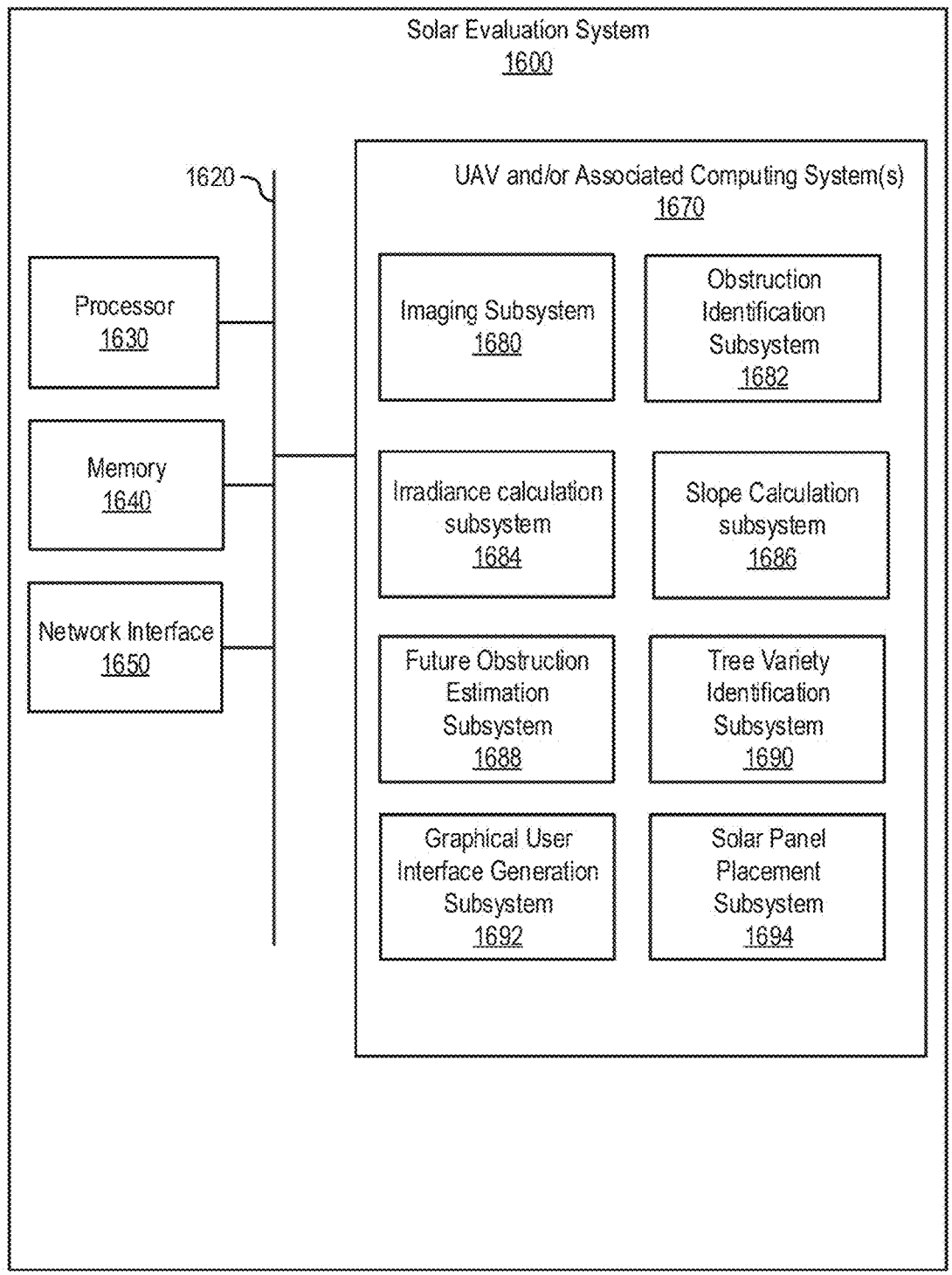
FIG. 16 illustrates a UAV-based solar power system design system, according to one embodiment.

FIG. 16 illustrates a UAV-based solar evaluation system 1600. The UAV solar evaluation system 1600 may include a processor 1630, memory 1640, and a network interface 1650 connected via a bus 1620 to various subsystems 1670 of a UAV and/or associated computing systems. Examples of the various subsystems 1670 include the various system, subsystem, and modules to implement the methods and techniques described herein. Examples of such subsystems are illustrated, including an imaging subsystem 1680 with an electronic hardware camera, obstruction identification subsystem 1682, irradiance calculation subsystem 1684, slope calculation subsystem 1686, future obstruction estimation subsystem 1688, tree variety identification subsystem 1690, graphical user interface generation subsystem 1692, and solar panel placement subsystem 1694.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A system for determining solar exposure on a roof of a structure, comprising:
    an unmanned aerial vehicle (UAV) system to navigate a flight pattern relative to a structure;
    a camera on the UAV to capture images of at least a portion of a roof of the structure during navigation of the flight pattern by the UAV;
    an imaging subsystem to utilize images captured by the camera on the UAV to identify:
        characteristics of the portion of the roof of the structure,
        at least one obstruction on the roof of the structure identified to cast a first shadow on the portion of the roof of the structure for a first amount of time during a time period, and
        at least one obstruction proximate the structure identified to cast a second shadow on the portion of the roof of the structure for a second amount of time during the time period; and
    an irradiance exposure subsystem to calculate a total irradiance on the portion of the roof of the structure during the time period based, at least in part, on the first and second shadows cast for the first and second amounts of time during the time period.

2. The system of claim 1, wherein the characteristics of the portion of the roof comprise a slope angle and orientation of the portion of the roof.

3. The system of claim 1, wherein the at least one obstruction on the roof of the structure comprises one of a chimney, vent pipe, another portion of the roof, swamp cooler, and satellite dish.

4. The system of claim 1, wherein the at least one obstruction proximate the structure comprises a tree.

5. The system of claim 1, wherein the at least one obstruction proximate the structure comprises a second structure.

6. The system of claim 1, wherein the at least one obstruction on the roof of the structure comprises an existing obstruction, and wherein the least one obstruction proximate the structure comprises a future obstruction.

7. The system of claim 1, wherein the at least one obstruction proximate the structure comprises a future obstruction.

8. The system of claim 7, wherein the future obstruction proximate the structure comprises a vacant lot identified to accommodate a future building estimated to cast the second shadow on the portion of the roof for the second amount of time during the time period in future years.

9. The system of claim 8, wherein the flight pattern includes an approximate 360-degree rotation of the UAV to capture images, via the camera, of regions surrounding the structure, including the vacant lot.

10. The system of claim 7, wherein the future obstruction proximate the structure comprises a tree estimated to grow to a height at which the tree is estimated to cast the second shadow on the portion of the roof for the second amount of time during the time period in future years.

11. The system of claim 10, further comprising a tree variety identification subsystem to identify a variety of the tree, and wherein the identified tree variety is used to estimate the height to which the tree is estimated to grow.

12. The system of claim 1, wherein the time period comprises one of: a one-month period, a three-month period, a twelve-month period, and a multi-year period.

* * * * *